(12) United States Patent
Long et al.

(10) Patent No.: US 8,155,084 B2
(45) Date of Patent: Apr. 10, 2012

(54) USER EQUIPMENT, CALL CONTINUITY APPLICATION SERVER, AND NETWORK HANDOVER METHOD

(75) Inventors: Shuiping Long, Shenzhen (CN); Jie Xu, Shenzhen (CN); Yi Zhang, Shenzhen (CN); Fang You, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 549 days.

(21) Appl. No.: 12/368,620

(22) Filed: Feb. 10, 2009

(65) Prior Publication Data

US 2009/0147754 A1 Jun. 11, 2009

Related U.S. Application Data

(63) Continuation of application No. PCT/CN2007/070666, filed on Sep. 10, 2007.

(30) Foreign Application Priority Data

Sep. 8, 2006 (CN) .......................... 2006 1 0122010
Oct. 12, 2006 (CN) .......................... 2006 1 0139133

(51) Int. Cl.
*H04W 4/00* (2009.01)
*H04L 12/66* (2006.01)
(52) U.S. Cl. ........................................ 370/331; 370/352
(58) Field of Classification Search .................. None
See application file for complete search history.

(56) References Cited

U.S. PATENT DOCUMENTS

| 5,101,501 | A | 3/1992 | Gilhousen | |
|---|---|---|---|---|
| 6,871,070 | B2 * | 3/2005 | Ejzak | .......................... 455/435.1 |
| 7,006,479 | B1 | 2/2006 | Joo et al. | |
| 2006/0104306 | A1 * | 5/2006 | Adamczyk et al. | ........... 370/466 |
| 2007/0072605 | A1 * | 3/2007 | Poczo | ......................... 455/432.2 |
| 2008/0013619 | A1 * | 1/2008 | Meylan et al. | ................. 375/240 |
| 2008/0032695 | A1 * | 2/2008 | Zhu et al. | ....................... 455/442 |

(Continued)

FOREIGN PATENT DOCUMENTS

CN 1226794 A 8/1999

(Continued)

OTHER PUBLICATIONS

International Search Report issued in corresponding PCT Application No. PCT/CN2007/070666; mailed Dec. 20, 2007.

(Continued)

*Primary Examiner* — Chi Pham
*Assistant Examiner* — Soon-Dong Hyun
(74) *Attorney, Agent, or Firm* — Brinks Hofer Gilson & Lione

(57) ABSTRACT

A network handover method applicable to network handover in ringing/ring back tone (RBT) or call hold is provided. According to this method, in ringing/RBT, one party performs a session negotiation with an Other End Point (OEP) via a call continuity application server, and then sends an off-hook signal to the OEP via the call continuity application server after the negotiation succeeds. Further, a call continuity application server and a user equipment (UE) are provided. According to the present disclosure, in ringing/RBT or call hold, even if the network coverage is not good, the UE may also be handed over to another network through call continuity, so as to effectively prevent the UE from dropping a call in ringing/RBT or call hold and thus improve the conversation quality of the user.

15 Claims, 13 Drawing Sheets

U.S. PATENT DOCUMENTS

2008/0117859 A1* 5/2008 Shahidi et al. ............... 370/328
2009/0067408 A1* 3/2009 Leppainen et al. ........... 370/350

FOREIGN PATENT DOCUMENTS

| CN | 1606266 A | 4/2005 |
|---|---|---|
| CN | 1751495 A | 3/2006 |
| WO | WO 2006/138736 A2 * | 12/2006 |

OTHER PUBLICATIONS

Office Action issued in corresponding Chinese Patent Application No. 2006101391332, mailed Jun. 5, 2009.

Written Opinion of the International Searching Authority issued in corresponding PCT Patent Application No. PCT/CN2007/070666, mailed Dec. 20, 2007.

* cited by examiner

USER EQUIPMENT, CALL CONTINUITY APPLICATION SERVER, AND NETWORK HANDOVER METHOD

CROSS REFERENCE TO RELATED APPLICATIONS

The application is a continuation application of, and claims priority to, PCT/CN2007/070666, filed on Sep. 10, 2007, which claims priority to Chinese Patent Applications No. 200610122010.8 and No. 200610139133.2, respectively filed on Sep. 8, 2006, and on Oct. 12, 2006, and both entitled "USER EQUIPMENT, VOICE CALL CONTINUITY APPLICATION SERVER, AND NETWORK HANDOVER METHOD", the contents of which are incorporated herein by reference in their entireties.

BACKGROUND

1. Field of the Disclosure

The present disclosure relates to a technical field of IP multimedia subsystem (IMS), and more particularly to a method for implementing a voice call continuity (VCC) network handover in ringing/ring back tone (RBT) or call hold, a related VCC application server (VCC AS), and a user equipment (UE).

2. Description of the Related Art

An IP multimedia subsystem (IMS) is a subsystem proposed by the 3rd Generation Partnership Project (3GPP) in Release 5 (R5) for supporting IP multimedia services, and is characterized in that session initiation protocol (SIP) is adopted and that the IMS is irrelevant to the access manners. The IMS provides a universal service platform for future multimedia applications and is an important step in the evolution to all-IP network service providing systems.

R5 and Release 6 (R6) for IMS standards were derived in a 3GPP standard system. After R6 became basically stable in March, 2005, Release 7 (R7) was proposed by the 3GPP. R7 not only enhances the existing system functions, but also adds some completely new functions.

As IMS voice services and circuit-switched (CS) voice services may exist concurrently in a period of time, the handover between voice services is a problem in urgent need of solutions. A voice call continuity (VCC) function is a new function proposed in R7 for solving the problem.

As defined according to the above standards, VCC refers to voice call continuity, that is, the continuity of a call is maintained when the user switches between various access technologies. For example, when the user moves from a conventional 2G network (e.g., a global system for mobile communications or code division multiple access network) to a 3G network (e.g., a universal mobile telecommunications system or high-rate packet data network), the call continues, and meanwhile other 3G services such as high speed internet access services can be initiated.

Referring to FIG. 1, in order to support the VCC, when a user initiates or receives a call via a circuit switched (CS) network (i.e., a 2G network), all signaling has to enter an IMS network. A network element VCC application server (VCC AS) in the IMS network is configured to control a VCC handover. Further, a network element that enables the user to access the CS network via the IMS network is a media gateway control function (MGCF). The MGCF also controls a media gateway (MGW) to route bearer traffic.

Currently, the VCC handover is assumed to be performed with an ongoing call, and VCC handovers in ringing/ring back tone (RBT) (i.e., calling/called situation) and call hold are not taken into consideration. As a result, problems may occur. For example, when a user equipment (UE) leaves the coverage of an IMS hot spot and is in ringing/RBT or call hold, as the UE cannot perform a VCC network handover, a call drop may occur and affect the conversation quality of the users.

SUMMARY

The disclosed method includes the steps of: performing, by the UE that initiates a handover, a session negotiation on call continuity handover in a call-hold state with an Other End Point (OEP) via a target network; and handing over a call to the target network after the session negotiation succeeds.

A method for a UE to perform network handover is further provided. The method includes the steps of: receiving a network handover request carrying session description information of the UE from the UE that initiates a handover; if it is detected that a call is in a call-hold state, updating the session description information and sending session description information carrying call-hold information of the UE that initiates the handover to an OEP, and handing over the corresponding call to a target network according to the network handover request after a session negotiation of the UE with the OEP by using the session description information succeeds.

Accordingly, a UE is provided. The UE includes: a session negotiation processing unit, adapted to perform a session negotiation on call continuity handover in a call-hold state with an OEP via a target network; and a call-hold call continuity handover unit, adapted to hand over a call to the target network after the session negotiation succeeds.

A call continuity application server is also provided. The server includes: a call-hold call continuity session negotiation processing unit, adapted to perform a session negotiation for a handover to a target network in a call-hold state; and a call-hold call continuity handover control unit, adapted to control a call continuity network handover in a call-hold state after the session negotiation succeeds.

BRIEF DESCRIPTION OF THE DRAWINGS

The present disclosure will become better understood from the detailed description given herein below for illustration only, and thus are not limitative of the present disclosure.

DETAILED DESCRIPTION OF THE EMBODIMENTS

Figure 1:
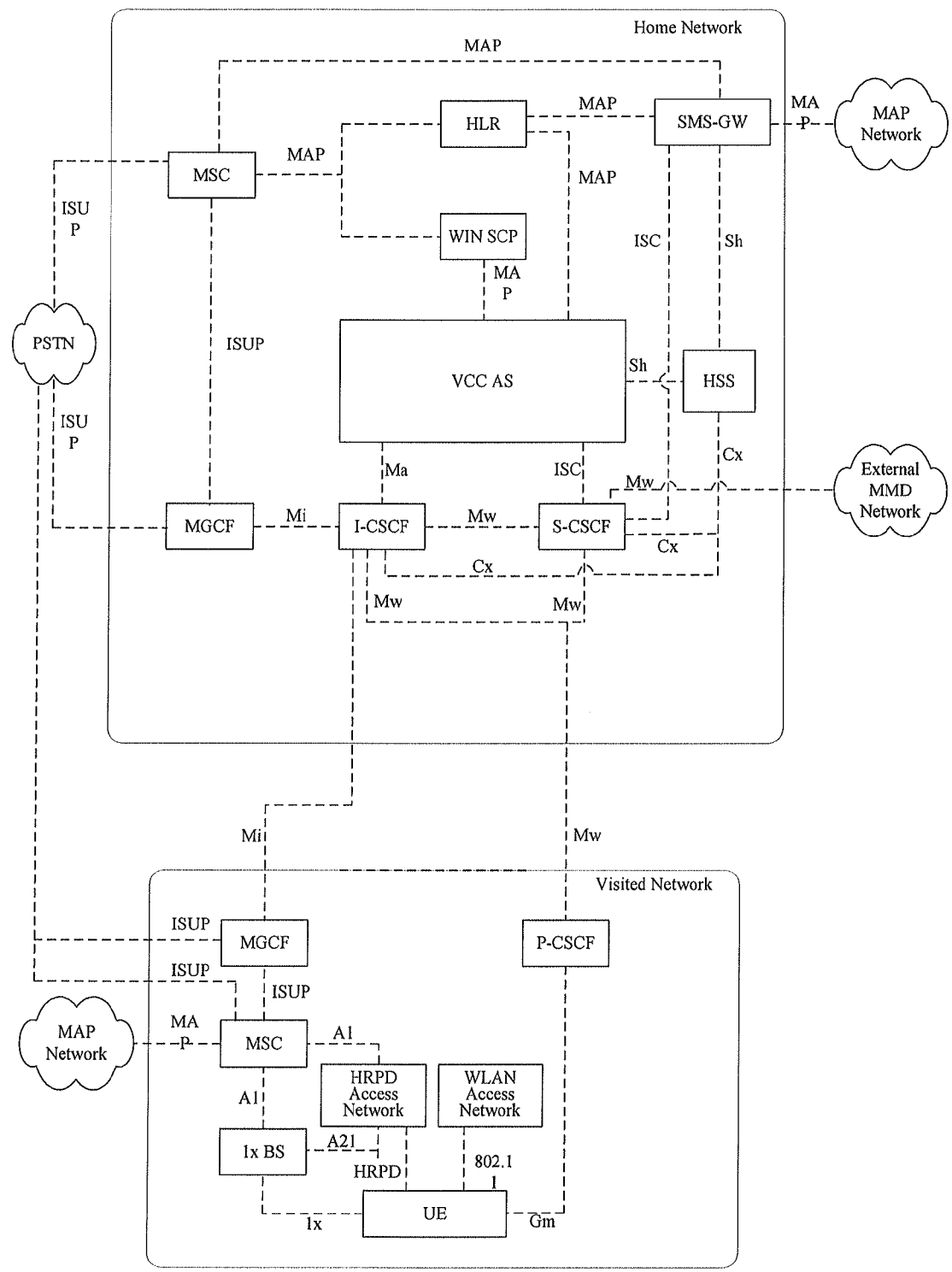
FIG. 1 is a reference model of a voice call continuity (VCC) structure in the prior art.

In the embodiments of the present disclosure, in ringing/RBT, one party performs a session negotiation with an Other End Point (OEP) via a call continuity application server (the call continuity application server includes voice, video, and/or audio-video call continuity application servers, and is illustrated hereinafter by taking a voice call continuity application server (VCC AS) as an example), and then the VCC AS sends an off-hook signal to the OEP after the negotiation succeeds, thereby achieving a VCC network handover in ringing/RBT. Further, in call hold, a user equipment (UE) that initiates a handover performs a call-hold session negotiation with an OEP via a VCC AS in a target network, and is then handed over to the target network after the session negotiation succeeds. Therefore, the problem that when a UE is in ringing/RBT or call hold and the network coverage is not good, the UE cannot perform a VCC handover, thus resulting in a poor call quality of the user, is solved. Operation flows of a ringing network handover, an RBT network handover, and a call-hold network handover are described below, respectively.

In an embodiment of the present disclosure, a method for a UE to perform network handover is provided. The method includes the steps of: performing, by the UE that initiates a handover, a session negotiation on call continuity handover in a call-hold state with an OEP via a target network; and handing over a call to the target network after the session negotiation succeeds. In this embodiment, the UE performs the call-hold session negotiation with the OEP via a call continuity application server in the target network. In this embodiment, the method further includes: sending, by the UE, a network handover request carrying session description information of the UE to the call continuity application server. The performing the session negotiation further includes: performing a session negotiation according to the session description information. The handing over the call to the target network after the session negotiation succeeds further includes handing over a call corresponding to the network handover request to the target network after the session negotiation according to the session description information succeeds.

In this embodiment, the session description information carries call-hold information of the UE that initiates the handover.

When a network to be handed over by the UE that initiates the handover is a circuit switched (CS) network and the target network is an IP multimedia subsystem (IMS) network, the performing, by the UE that initiates the handover, the call-hold session negotiation with the OEP via the call continuity application server in the target network includes: sending, by the UE that initiates the handover, a network handover request carrying session description information of the UE to a call continuity application server via the IMS network.

When the network to be handed over is an IMS network and the target network is a CS network, the performing, by the UE that initiates the handover, the call-hold session negotiation with the OEP via the call continuity application server in the target network includes: sending, by the UE that initiates the handover, an INVITE message to a call continuity application server via the CS network, a mobile switching center (MSC), and a media gateway control function (MGCF). The INVITE message contains session description information of the MGCF.

In another embodiment of the present disclosure, a method for a UE to perform network handover is provided, which includes the steps of: receiving a network handover request carrying session description information of the UE from the UE that initiates a handover; if it is detected that a call is in a call-hold state, updating the session description information and sending session description information carrying call-hold information of the UE that initiates the handover to an OEP; and handing over the corresponding call to a target network according to the network handover request after a session negotiation of the UE with the OEP by using the session description information succeeds.

The method further includes: receiving session description information carrying call-hold information of the OEP fed back from the OEP; and sending the session description information carrying the call-hold information of the OEP to the UE that initiates the handover.

Moreover, when the detected call-hold state is a call hold actively initiated by the UE that initiates the handover, the session description information carrying the call-hold information of the UE that initiates the handover is send-only (sendonly) session description information, and the session description information carrying the call-hold information of the OEP is receive-only (recvonly) session description information.

In addition, when the call-hold state detected by a call continuity application server is a call hold initiated by the OEP, the session description information carrying the call-hold information of the UE that initiates the handover is recvonly session description information, and the session description information carrying the call-hold information of the OEP is sendonly session description information.

The recvonly session description information is added by the UE that initiates the handover or the call continuity application server.

In this embodiment, the method further includes: releasing a call leg of a network to be handed over.

When the network to be handed over is an IMS network and the target network is a CS network, an INVITE message sent by the UE that initiates the handover via the CS network and an MSC is received from an MGCF, and the INVITE message contains session description information of the MGCF. The updating the session description information and sending the session description information carrying the call-hold information of the UE that initiates the handover to the OEP further includes: generating an UPDATE message of the session description information according to the INVITE message, and sending an INVITE or UPDATE message that contains session description information carrying call-hold information of the MGCF to an OEP.

When the detected call-hold state is a call hold actively initiated by the UE that initiates the handover, the session description information carrying the call-hold information of the MGCF is sendonly session description information, and the session description information carrying the call-hold information of the OEP is recvonly session description information. After the session negotiation succeeds, the method further includes: synchronizing call-hold states of the UE that initiates the handover and the MSC.

Further, when the detected call-hold state is a call hold initiated by the OEP, the session description information carrying the call-hold information of the MGCF is recvonly session description information, and the session description information carrying the call-hold information of the OEP is sendonly session description information. After the session negotiation succeeds, the method further includes: synchronizing call-hold states of the call continuity application server and the CS network.

In an embodiment of the present disclosure, a method for a UE to perform network handover is provided. The method includes the steps of: performing, by a called UE, a session negotiation on call continuity handover in a ringing state with a calling UE at an OEP via a target network; and handing over a call to the target network after the session negotiation succeeds, and sending, by the called UE, an off-hook signal to the calling UE at the OEP. The called UE performs the ringing session negotiation on call continuity handover with the calling UE at the OEP via a call continuity application server in the target network. The handing over the call to the target network after the session negotiation succeeds, and sending, by the called UE, the off-hook signal to the calling UE at the OEP includes: sending, by the called UE, an off-hook signal to the call continuity application server after the call is handed over; and detecting, by the call continuity application server, that the called UE is off-hook, and then sending, by the call continuity application server, the off-hook signal to the calling UE at the OEP.

The sending, by the called UE, the off-hook signal to the call continuity application server includes: sending, by the called UE, signaling of an off-hook signal to the call continuity application server via a network to be handed over where the called UE is located.

The sending, by the called UE, the off-hook signal to the call continuity application server includes: sending an off-hook signal to the call continuity application server through a session initiation protocol (SIP)-based notification message, an unstructured supplementary service data (USSD) service, or a short message service (SMS).

After the detecting, by the call continuity application server, that the called UE is off-hook, the method further includes: releasing, by the call continuity application server, a call leg of the network to be handed over.

When the network to be handed over is a CS network and the target network is an IMS network, the performing, by the called UE, the ringing session negotiation on call continuity handover with the calling UE at the OEP via the call continuity application server in the target network includes: sending, by the called UE, a session INVITE message carrying to session description information of the called UE to a call continuity application server via the IMS network; detecting, by the call continuity application server, that the call is in a non-conversation state, generating, by the call continuity application server, an UPDATE message according to the session INVITE message, and sending, by the call continuity application server, the UPDATE message to the calling UE at the OEP; feeding back, by the calling UE at the OEP, an update response message carrying session description information of the calling UE at the OEP to the call continuity application server; and generating, by the call continuity application server, a temporary response message according to the update response message, and sending, by the call continuity application server, the temporary response message carrying the session description information of the calling UE to the called UE.

When the network to be handed over is an IMS network and the target network is a CS network, the performing, by the called UE, the ringing session negotiation on call continuity handover with the calling UE at the OEP via the call continuity application server includes: initiating, by the called UE, a call origination message to an MSC via the CS network; generating, by the MSC, an initial address message (IAM) according to the call origination message, and sending, by the MSC, the IAM to an MGCF; resolving, by the MGCF, the IAM to obtain numbers of the called UE and a call continuity application server, feeding back, by the MGCF, an address complete message (ACM) to the MSC, and sending, by the MGCF, a session INVITE message carrying session description information of the MGCF to the call continuity application server, in which the session INVITE message contains the numbers of the called UE and the call continuity application server; detecting, by the call continuity application server, that the call is in a non-conversation state, generating, by the call continuity application server, an UPDATE message of the session description information according to the session INVITE message, and sending, by the call continuity application server, the UPDATE message to the calling UE at the OEP; feeding back, by the calling UE at the OEP, an update response message carrying session description information of the calling UE at the OEP to the call continuity application server; and generating, by the call continuity application server, a temporary response message carrying the session description information of the calling UE at the OEP according to the update response message, and sending, by the call continuity application server, the temporary response message to the MGCF.

In another embodiment of the present disclosure, a method for a UE to perform network handover is provided, in which a network to be handed over is an IMS network and a target network is a CS network. The method includes the steps of: performing, by a calling UE, a session negotiation on call continuity handover in an RBT state with a called UE at an OEP via the target network; and handing over a call to the target network after the session negotiation succeeds, and receiving, by the calling UE, an off-hook signal sent by the called UE at the OEP.

The calling UE performs the RBT session negotiation on call continuity handover with the called UE at the OEP via a call continuity application server in the target network.

After the handing over the call to the target network after the session negotiation succeeds, the method further includes: sending, by the called UE at the OEP, an off-hook signal to the call continuity application server at the OEP after the session negotiation succeeds; and sending, by the call continuity application server, the received off-hook signal to the calling UE.

The performing, by the calling UE, the RBT session negotiation on call continuity handover with the called UE at the OEP includes: initiating, by the calling UE, a call origination message to an MSC via the CS network; generating, by the MSC, an IAM according to the call origination message, and sending, by the MSC, the IAM to an MGCF; resolving, by the MGCF, the IAM to obtain numbers of the calling UE and a call continuity application server, feeding back, by the MGCF, an ACM to the MSC, and sending, by the MGCF, a session INVITE message carrying session description information of the MGCF to the call continuity application server, in which the session INVITE message contains the numbers of the calling UE and the call continuity application server; detecting, by the call continuity application server, that the call is in a non-conversation state, generating, by the call continuity application server, an UPDATE message of the session description information according to the session INVITE message, and sending, by the call continuity application server, the UPDATE message to the called UE at the OEP; feeding back, by the called UE at the OEP, an update response message carrying session description information of the called UE at the OEP to the call continuity application server; and generating, by the call continuity application server, a temporary response message carrying the session description information of the called UE at the OEP according to the update response message, and sending, by the call continuity application server, the temporary response message to the MGCF.

In another embodiment of the present disclosure, a method for a UE to perform network handover is further provided, which includes the steps of: performing, by the UE that initiates a handover, a session negotiation on call continuity handover in a call-hold state with an OEP via a target network; and handing over a call to the target network after the session negotiation succeeds.

The UE performs the call-hold session negotiation with the OEP via a call continuity application server in the target network.

After the performing the session negotiation, the method further includes: releasing, by the call continuity application server, a call leg of a network to be handed over.

When the network to be handed over is a CS network and the target network is an IMS network, the performing, by the UE that initiates the handover, the call-hold session negotiation with the OEP via the call continuity application server in the target network includes: sending, by the UE that initiates the handover, a network handover request carrying session description information of the UE to a call continuity application server via the IMS network; if the call continuity application server detects that a call is in a call-hold state, updating the session description information and sending session description information carrying call-hold information of the UE that initiates the handover to an OEP; feeding back, by the OEP, session description information carrying call-hold information of the OEP to the call continuity application server; and sending, by the call continuity application server, the session description information carrying the call-hold information of the OEP to the UE that initiates the handover.

When the call-hold state detected by the call continuity application server is a call hold actively initiated by the UE that initiates the handover, the session description information carrying the call-hold information of the UE that initiates the handover is sendonly session description information, and the session description information carrying the call-hold information of the OEP is recvonly session description information.

When the call-hold state detected by the call continuity application server is a call hold initiated by the OEP, the session description information carrying the call-hold information of the UE that initiates the handover is recvonly session description information, and the session description information carrying the call-hold information of the OEP is sendonly session description information.

The recvonly session description information is added by the UE that initiates the handover or the call continuity application server.

When the network to be handed over is an IMS network and the target network is a CS network, the performing, by the UE that initiates the handover, the call-hold session negotiation with the OEP via the call continuity application server in the target network includes: initiating, by the UE that initiates the handover, a call origination message to an MSC via the CS network; generating, by the MSC, an IAM according to the call origination message, and sending, by the MSC, the IAM to an MGCF; sending, by the MGCF, an INVITE message containing session description information of the MGCF to a call continuity application server; detecting, by the call continuity application server, that the call is in a call-hold state, generating, by the call continuity application server, an UPDATE message of the session description information according to the INVITE message, and sending, by the call continuity application server, an INVITE or UPDATE message that contains session description information carrying call-hold information of the MGCF to the OEP; feeding back, by the OEP, session description information carrying call-hold information of the OEP to the call continuity application server; and sending, by the call continuity application server, the session description information carrying the call-hold information of the OEP to the MGCF.

When the call-hold state detected by the call continuity application server is a call hold actively initiated by the UE that initiates the handover, the session description information carrying the call-hold information of the MGCF is sendonly session description information, and the session description information carrying the call-hold information of the OEP is recvonly session description information.

After the session negotiation succeeds, the method further includes: synchronizing call-hold states of the UE that initiates the handover and the MSC.

When the call-hold state detected by the call continuity application server is a call hold initiated by the OEP, the session description information carrying the call-hold information of the MGCF is recvonly session description information, and the session description information carrying the call-hold information of the OEP is sendonly session description information.

After the session negotiation succeeds, the method further includes: synchronizing call-hold states of the call continuity application server and the CS network.

Figure 2:
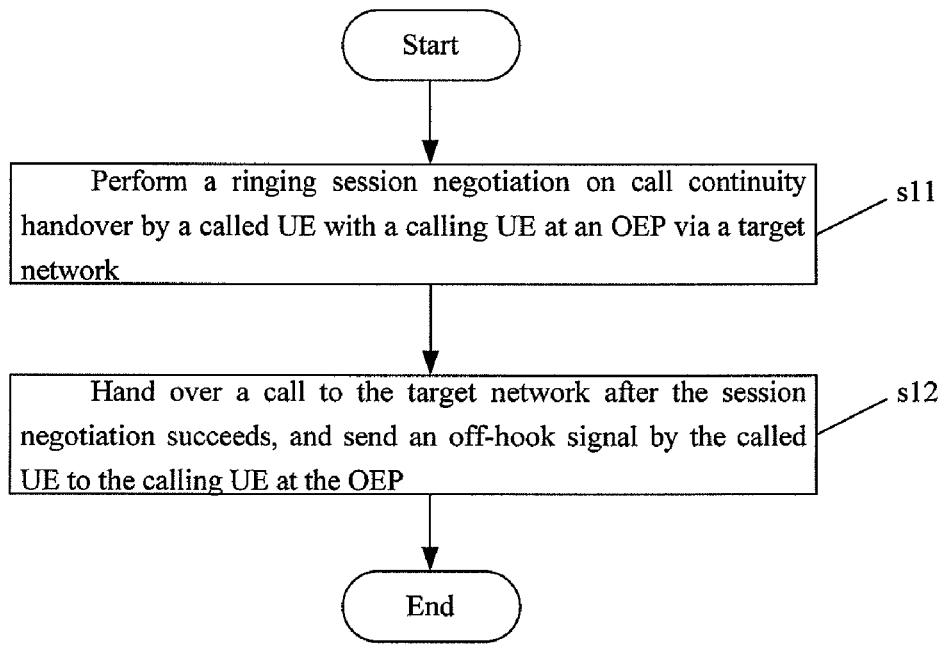
FIG. 2 is a flow chart of a method for a called user equipment (UE) to perform network handover in ringing according to an embodiment of the present disclosure.

FIG. 2 is a flow chart of a method for a called UE to perform network handover in ringing according to an embodiment of the present disclosure. Referring to FIG. 2, the method includes the following steps.

In Step s11, a called UE performs a ringing session negotiation on call continuity handover with a calling UE at an OEP via a target network.

Preferably, the called UE performs the ringing session negotiation on call continuity handover with the calling UE at the OEP via a VCC AS in the target network. In practice, the specific processing flow of the session negotiation varies with different target networks to which a call is to be handed over.

In Step s12, a call is handed over to the target network after the session negotiation succeeds, and the called UE sends an off-hook signal to the calling UE at the OEP.

That is to say, the called UE is handed over to the target network after the session negotiation succeeds and then sends an off-hook signal to the calling UE at the OEP via the VCC AS, i.e., the called UE sends an off-hook signal to the VCC AS, and the VCC AS sends the off-hook signal to the calling UE at the OEP when detecting that the called UE is off-hook.

It should be noted that, in the present disclosure, after the VCC AS detects that the called UE is off-hook, the method further includes: releasing, by the VCC AS, a call leg of the network to be handed over. In practice, the call leg of the network to be handed over may also be removed in other manners, and the details are not given herein again.

Figure 3:
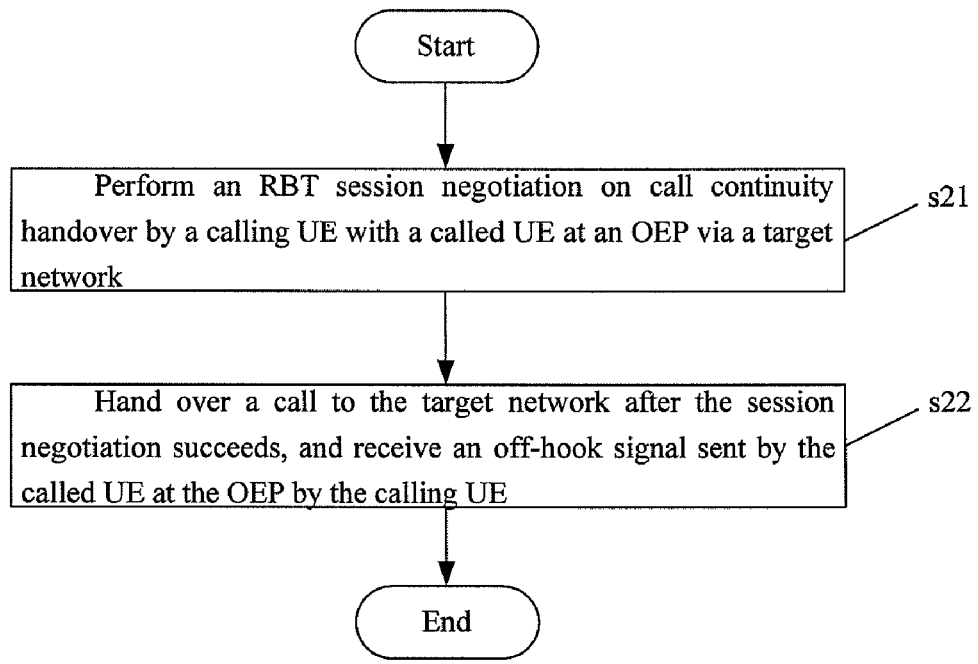
FIG. 3 is a flow chart of a method for a calling UE to perform network handover in RBT according to an embodiment of the present disclosure.

FIG. 3 is a flow chart of a method for a calling UE to perform network handover in RBT according to an embodiment of the present disclosure, in which a network to be handed over is, for example, an IMS network, and a target network is, for example, a CS network. Referring to FIG. 3, the method includes the following steps.

In Step s21, a calling UE performs an RBT VCC handover session negotiation with a called UE at an OEP via the target network.

Preferably, the calling UE performs the RBT VCC handover session negotiation with the called UE at the OEP via a VCC AS in the CS network.

In Step s22, a call is handed over to the target network after the session negotiation succeeds, and the calling UE receives an off-hook signal sent by the called UE at the OEP.

That is to say, the called UE at the OEP sends an off-hook signal, and the VCC AS detects the off-hook signal and then sends the off-hook signal to the calling UE, thereby completing the handover.

The network handover method of the present disclosure is described in detail below through a specific message processing flow.

Figure 4:
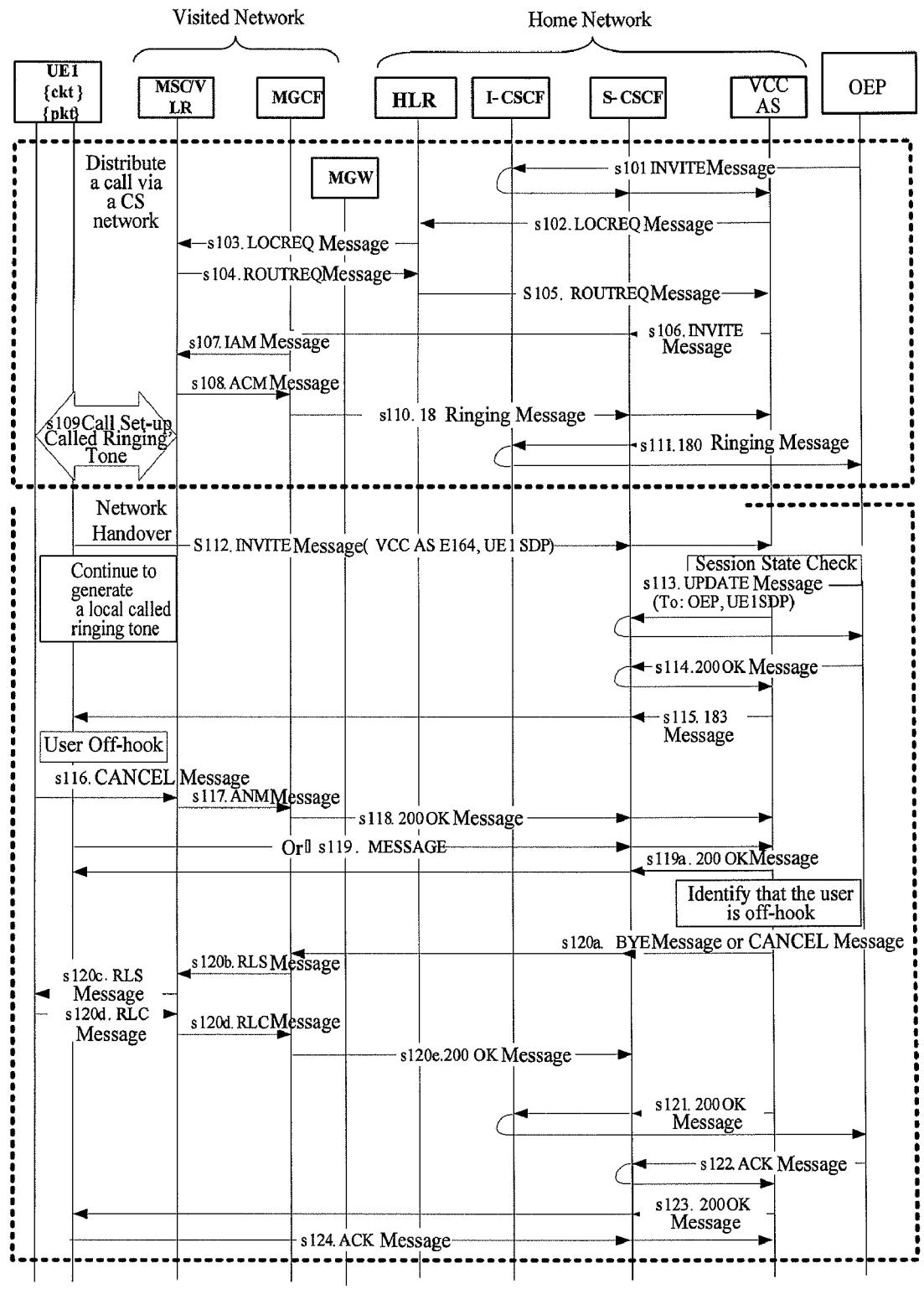
FIG. 4 is a flow chart of a method for a called UE to perform handover from a circuit switched (CS) network to an IP multimedia subsystem (IMS) network in ringing according to an embodiment of the present disclosure.

FIG. 4 is a flow chart of a method for a called UE to perform handover from a CS network to an IMS network in ringing according to an embodiment of the present disclosure. In this embodiment, messages are based on an SIP protocol, and a specific processing flow is described as follows.

In Step s101, an OEP (including a calling terminal and a related network) sends a session INVITE message to an interrogating-call session control function (I-CSCF) of an IMS network where a UE 1 is located. The I-CSCF selects a service-call session control function (S-CSCF) and forwards the INVITE message to the S-CSCF. The INVITE message contains uniform resource identifier (URI) information of the called UE 1 (e.g., Bob@huawei.com), and session description protocol (SDP) information of the OEP (including media type, coding scheme, and media-transmission/reception IP address and port to be established).

Based on a filtering policy, the S-CSCF sends the INVITE message to a VCC AS, and the VCC AS establishes an SIP call dialog 1 with the OEP as an SIP back-to-back user agent (B2BUA).

In Step s102 to Step s105, the VCC AS determines that the call needs to be distributed via a CS network, and then obtains a temporary local directory number (TLDN) from a home location register (HLR) via a mobile application protocol (MAP). In this embodiment, an MAP message may be adopted, and other corresponding protocols may also be adopted. The MAP message contains a localizer request (LOCREQ) message and a router request (ROUTREQ) message.

In Step s106, the VCC AS modifies the previously received INVITE message to modify a Request URI into an E.164 number (for example, a TLDN in a code division multiple access (CDMA) network, or a mobile subscriber routing number (MSRN) in a global system for mobile communications (GSM)/universal mobile telecommunications system (UMTS) network) that can be routed to the CS network, and then sends the E.164 number to an MGCF via the S-CSCF, so that an SIP call dialog 2 is established between the VCC AS and the MGCF through the INVITE message.

In Step s107 to Step s108, the MGCF converts the INVITE message into an IAM, and sends the IAM to an MSC/VLR. The IAM contains trunk (TRK) information allocated between an MGW and the MSC. The MSC/VLR returns an ACM.

In Step s109, the UE 1 and the MSC/VLR complete a call set-up, and a local ringing tone is generated.

In Step s110 to Step s111, the MGCF sends a 180 ringing message to the VCC AS via the S-CSCF. The 180 ringing message contains MGW SDP, allocated TRK information (for connecting the OEP) of the MGW. The VCC AS then forwards the 180 ringing message to the OEP. That is to say, the VCC AS forwards the 180 ringing message to the I-CSCF via the S-CSCF, and the I-CSCF then forwards the 180 ringing message to the OEP.

Step s101 to Step sill are a flow of distributing a call via a CS network. In the present disclosure, after the call is distributed, the UE may also initiate a VCC network handover when determining that the call needs to be handed over to an IMS network according to some predefined policies (for example, changes in wireless conditions, and the call distributed via the CS network has been set up and is waiting for a user to answer), and the following steps are performed.

In Step s112, the UE 1 sends an INVITE message to the VCC AS via the S-CSCF. The INVITE message contains a Request URI (which is an E.164 number of the VCC AS), and may also contain SDP information of the UE 1.

In Step s113 to Step s114, the VCC AS detects that the call is in a non-conversation sate, generates an UPDATE message (in which the Request URI is modified into an address of the OEP) according to the received INVITE message, and sends the UPDATE message to the OEP. The OEP returns a 200 OK response message. The 200 OK response message contains SDP information returned by the OEP.

In Step s115, the VCC AS generates a temporary response message (which is a 183 message in this embodiment) according to the received 200 OK response message. The temporary response message (i.e., the 183 message) contains the SDP information returned by the OEP. The VCC AS sends the temporary response message to the UE 1 and waits for a user to off-hook, and then Step s116 is performed. Alternatively, if the UE determines that no signal from the CS network is available, Step s119 is performed.

In Step s116 to Step s118, the UE 1 detects that the user is off-hook, and sends an off-hook signal to the MSC/VLR through the call setup via the CS network (for example, through a CONNECT signaling message). After detecting the off-hook signal, the MSC/VLR sends an ANM message to the MGCF. The MGCF converts the ANM message into a 200 OK response message (a final response to Step s106) and then sends the 200 OK response message to the VCC AS.

In Step s119, the UE 1 sends a MESSAGE message to the VCC AS via an IP access network. The text of the MESSAGE message indicates that the user is off-hook. The VCC AS resolves the MESSAGE message correctly and then returns a 200 OK response message in response to the MESSAGE message.

In Step s120 (including Step s120a to Step s120e), the VCC AS releases a call leg (including the SIP call dialog 2) on the CS network side.

It should be noted that, in this embodiment, directed to Step s116 to Step s118, the VCC AS sends a BYE message to the MGCF; while directed to Step s119, the VCC AS may send a CANCEL message instead, and the MGCF returns a 200 OK message. The MGCF sends a release (RLS) message to the MSC to release the call on the MSC side, the MSC sends an RLS to the UE 1 to release a wireless connection, the UE returns a release complete (RLC) message, and the MSC returns an RLC message to the MGCF.

In Step s121 to Step s122, the VCC AS generates a 200 OK message (an off-hook signal, a final response to Step s101) and sends the 200 OK message to the OEP. The OEP returns an acknowledgement (ACK) message.

In Step s123 to Step s124, the VCC AS generates a 200 OK message (a final response to Step s112) and sends the 200 OK message to the UE 1. The UE 1 returns an ACK message.

Figure 5:
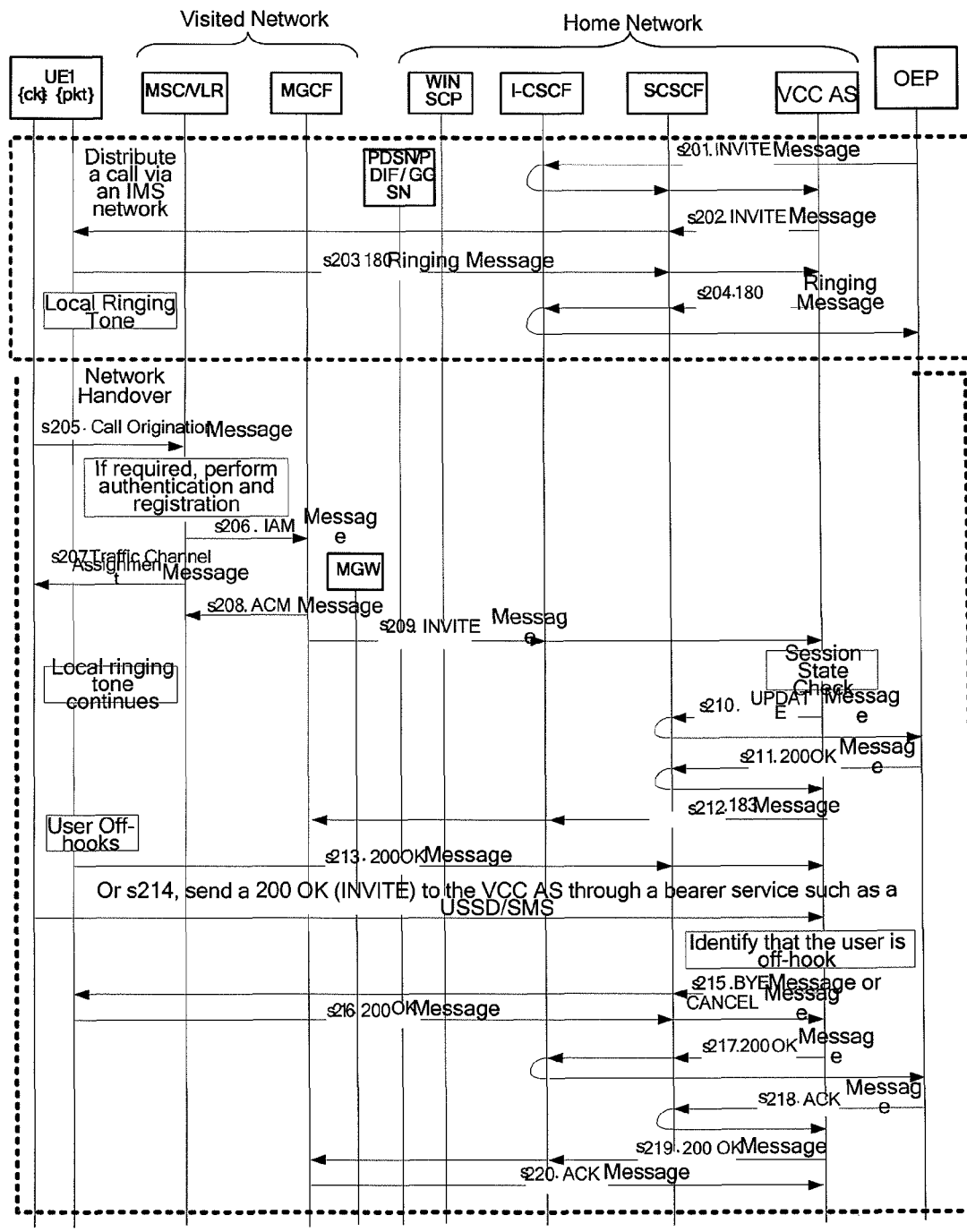
FIG. 5 is a flow chart of a method for a called UE to perform handover from an IMS network to a CS network in ringing according to an embodiment of the present disclosure.

FIG. 5 is a flow chart of a method for a called UE to perform handover from an IMS network to a CS network in ringing according to an embodiment of the present disclosure. In this embodiment, messages are based on an SIP protocol, and a specific processing flow is described as follows.

In Step s201, an OEP (including a calling terminal and a related network) sends a session INVITE message to an I-CSCF of an IMS network where a UE 1 is located. The I-CSCF selects an S-CSCF and forwards the INVITE message to the S-CSCF. The INVITE message contains URI information of the called UE 1 (for example, Bob@huawei.com), and SDP information of the OEP (including media type, coding scheme, and media-transmission/reception IP address and port to be established).

Based on a filtering policy, the S-CSCF sends the INVITE message to a VCC AS, and the VCC AS establishes an SIP call dialog 1 with the OEP as an SIP B2BUA.

In Step s202, the VCC AS determines that the call needs to be distributed via the IMS network and then returns the INVITE message to the S-CSCF, and the S-CSCF sends the INVITE message to the UE 1, so that an SIP call dialog 2 is established between the UE 1 and the VCC AS.

In Step s203, the UE 1 returns a 180 ringing message carrying SDP information (accepted media type, coding scheme, and media-transmission/reception IP address and port) thereof to the S-CSCF, and the S-CSCF forwards the 180 ringing message to the VCC AS.

In Step s204, the VCC AS returns the 180 ringing message to the I-CSCF via the S-CSCF, and at last, the I-CSCF sends the 180 ringing message to the OEP.

The UE 1 generates a local ringing tone, and then waits for a user of the UE 1 to off-hook. In the present disclosure, the UE 1 initiates a VCC network handover when determining that the call needs to be handed over to a CS network according to some predefined policies (for example, changes in wireless conditions, and a media negotiation of the call has been completed), and the following steps are performed.

In Step s205, the UE 1 initiates a call via the CS network, and sends a call origination message to an MSC/VLR. The call origination message contains a called party number (CdPN) (i.e., a service code+an E.164 number of the VCC AS) and a calling party number (CgPN) (i.e., a mobile directory number (MDN) of the UE 1, for example 133XXXX5678).

If required, an authentication and registration process of the CS network is performed.

In Step s206, the MSC/VLR generates an IAM and sends the IAM to an MGCF. The E.164 number of the VCC AS is used as the CdPN, the MDN of UE 1 is used as the CgPN, and the MSC/VLR discards the value of the service code.

In Step s207, the MSC/VLR sends a traffic channel assignment message to the UE 1, that is, the CS network assigns a traffic channel to the UE 1, and the UE 1 captures the traffic channel.

In Step s208, the MGCF sends an ACM to the MSC/VLR.

In Step s209, the MGCF generates an INVITE message (including TRK information allocated to the call, i.e., MGW SDP, containing IP address and bandwidth). A Request URI in the INVITE message is the E.164 number of the VCC AS. The message is sent to the VCC AS via the I-CSCF.

In Step s210 to Step s211, the VCC AS detects that the call is in a non-conversation sate, generates an UPDATE message (in which the Request URI is modified into an address of the OEP) according to the received INVITE message, and sends the UPDATE message to the OEP. The OEP returns a 200 OK response message. The 200 OK response message contains SDP information returned by the OEP.

In Step s212, the VCC AS generates a 183 message according to the received 200 OK response message, sends the 183 message to the UE 1, and then waits for the user of the UE 1 to off-hook.

In Step s213, the UE 1 detects that the user is off-hook (at any time after Step s215), and sends an off-hook signal to the VCC AS through the 200 OK response message. The VCC AS identifies that the user is off-hook.

Alternatively, if the UE 1 detects that the user is off-hook, but an IP access network is no longer available, Step s214 is performed, in which an off-hook message (for example, a packaged 200 OK message) is sent to the VCC AS through a bearer service such as an unstructured supplementary service data (USSD) service and a short message service (SMS) of the CS network.

In Step s215 to Step s216, the VCC AS releases the SIP call dialog 2.

It should be noted that, in this embodiment, directed to Step s213, the VCC AS sends a BYE message to release the SIP call dialog 2; while directed to Step s214, the VCC AS may send a CANCEL message to release the SIP call dialog 2 instead.

In Step s217 to Step s218, the VCC AS sends a 200 OK response message (a final response to Step s201) to the OEP, and the OEP returns an ACK message for acknowledgement.

In Step s219 to Step s220, the VCC AS generates a 200 OK response message (a final response to Step s209) and sends the 200 OK response message to the MGCF. The MGCF may either return an ACK message or send a CON/ACM to the MSC to indicate that a conversation can be carried out.

Figure 6:
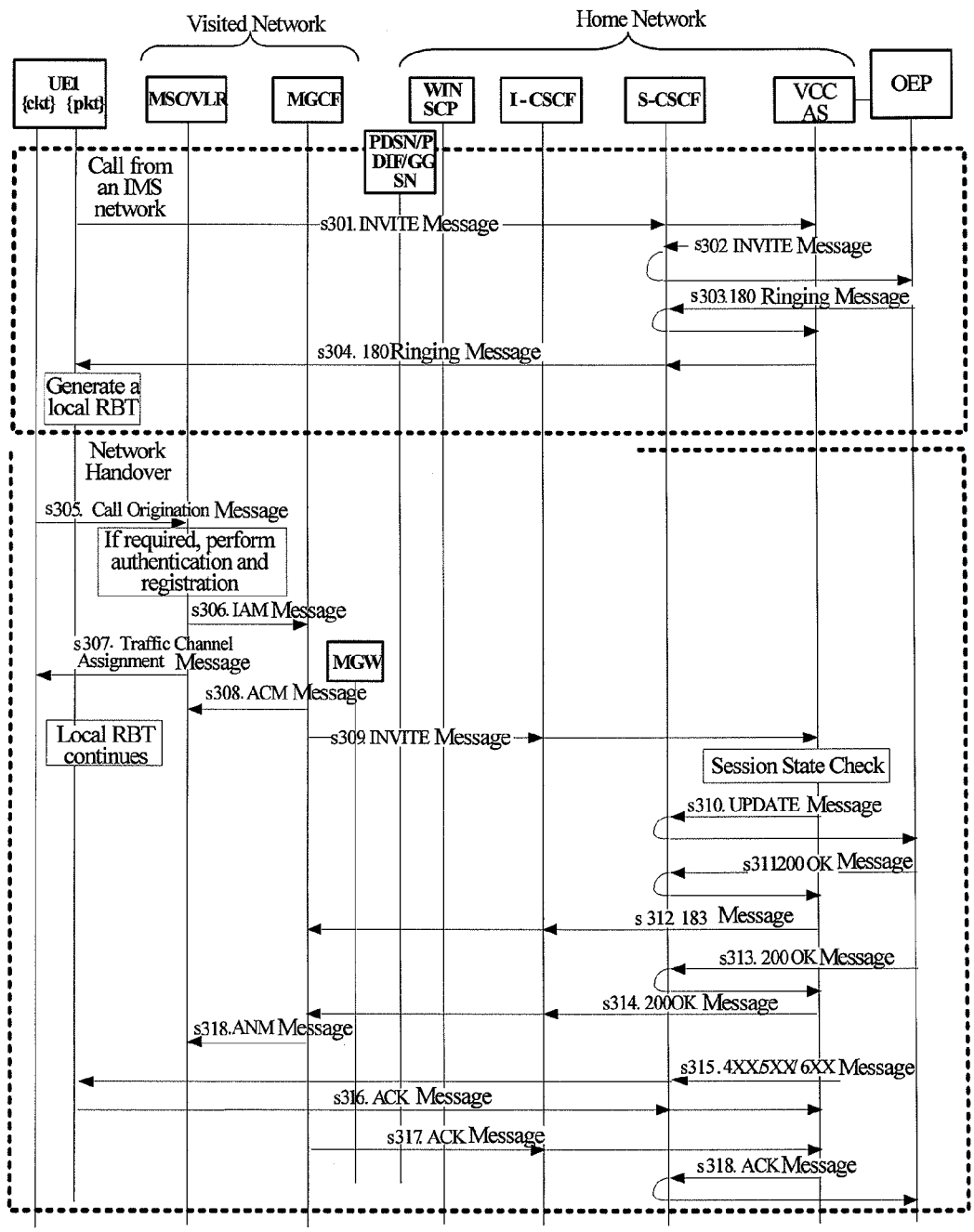
FIG. 6 is a flow chart of a method for a calling UE to perform handover from an IMS network to a CS network in RBT according to an embodiment of the present disclosure.

FIG. 6 is a flow chart of a method for a calling UE to perform handover from an IMS network to a CS network in RBT according to an embodiment of the present disclosure. In this embodiment, messages are based on an SIP protocol, and a specific processing flow is described as follows.

In Step s301, a UE 1 initiates a call via an IMS network, and sends a session INVITE message to an S-CSCF of the IMS network where the UE 1 is located. The INVITE message contains an address of a called UE at an OEP (e.g., Bob@huawei.com), and SDP information of the UE 1 (including media type, coding scheme, and media-transmission/reception IP address and port to be established).

Based on a filtering policy, the S-CSCF sends the INVITE message to a VCC AS, and the VCC AS establishes an SIP call dialog 1 with the UE 1 as an SIP B2BUA.

In Step s302, the VCC AS returns the INVITE message to the S-CSCF, and the S-CSCF sends the INVITE message to the OEP, so that an SIP call dialog 2 is established between the VCC AS and the OEP.

In Step s303, the OEP returns a 180 ringing message (indicating that the OEP is in a ringing state and waiting for a user to answer) carrying SDP information (accepted media type, coding scheme, and media-transmission/reception IP address and port) thereof to the S-CSCF, and the S-CSCF forwards the 180 ringing message to the VCC AS.

In Step s304, the VCC AS returns the 180 ringing message to the S-CSCF, and the S-CSCF sends the 180 ringing message to the UE 1. The UE 1 may generate a local ringing tone, and then wait for a user of the UE 1 to off-hook. In the present disclosure, the UE 1 initiates a VCC network handover when determining that the call needs to be handed over to a CS network according to some predefined policies (for example, changes in wireless conditions, and a media negotiation of the call has been completed), and the following steps are performed.

In Step s305, the UE 1 initiates a call via the CS network, and sends a call origination message to an MSC. The call origination message contains a CdPN (i.e., a service code+an E.164 number of the VCC AS) and a CgPN (i.e., an MDN of the UE 1).

If required, an authentication and registration process of the CS network is performed.

In Step s306, the MSC generates an integrated services digital network-user part (ISUP) IAM and sends the ISUP IAM to an MGCF. The E.164 number of the VCC AS is used as the CdPN, the MDN of UE 1 is used as the CgPN, and the MSC/VLR discards the value of the service code.

In Step s307, the MSC/VLR sends a traffic channel assignment message to the UE 1, that is, the CS network assigns a traffic channel to the UE 1, and the UE 1 captures the traffic channel.

In Step s308, the MGCF sends an ACM to the MSC/VLR.

In Step s309, the MGCF generates an INVITE message (including TRK information allocated to the call, i.e., MGW SDP, containing IP address and bandwidth). A Request URI in the INVITE message is the E.164 number of the VCC AS. The message is sent to the VCC AS via an I-CSCF.

In Step s310 to Step s311, the VCC AS detects that the call is in a non-conversation sate, generates an UPDATE message (in which the Request URI is modified into an address of the OEP) according to the received INVITE message, and sends the UPDATE message to the OEP. The OEP returns a 200 OK response message. The 200 OK response message contains SDP information returned by the OEP.

In Step s312, the VCC AS generates a 183 message containing the returned SDP information according to the received 200 OK response message (in response to Step s309), sends the 183 message to the UE 1, and then waits for the user of the UE 1 to off-hook.

In Step s313, the OEP detects that the user is off-hook, and then sends a 200 OK response message (a final response to Step s302) to the S-CSCF, and the S-CSCF forwards the 200 OK response message to the VCC AS.

In Step s314, the VCC AS sends the 200 OK response message to the MGCF via the I-CSCF, and the MGCF converts the 200 OK response message into a CON/ACM and then sends the CON/ACM to the MSC to indicate that a conversation can be carried out.

In Step s315 to Step s316, the MGCF sends an ACK message in response to the received 200 OK response message. The ACK message is forwarded to the S-CSCF by the VCC AS, and finally arrives at the OEP.

In Step s317, the VCC AS releases the SIP call dialog 1: by using a 4XX/5XX/6XX error response message.

In addition, a method for a UE to perform network handover is further provided. The method includes the steps of: performing, by the UE that initiates a handover, a session negotiation on call continuity handover in a call-hold state with an OEP via a target network; and handing over a call to the target network after the session negotiation succeeds.

A specific implementation process of the method is described in FIGS. 7 to 11.

Figure 7:
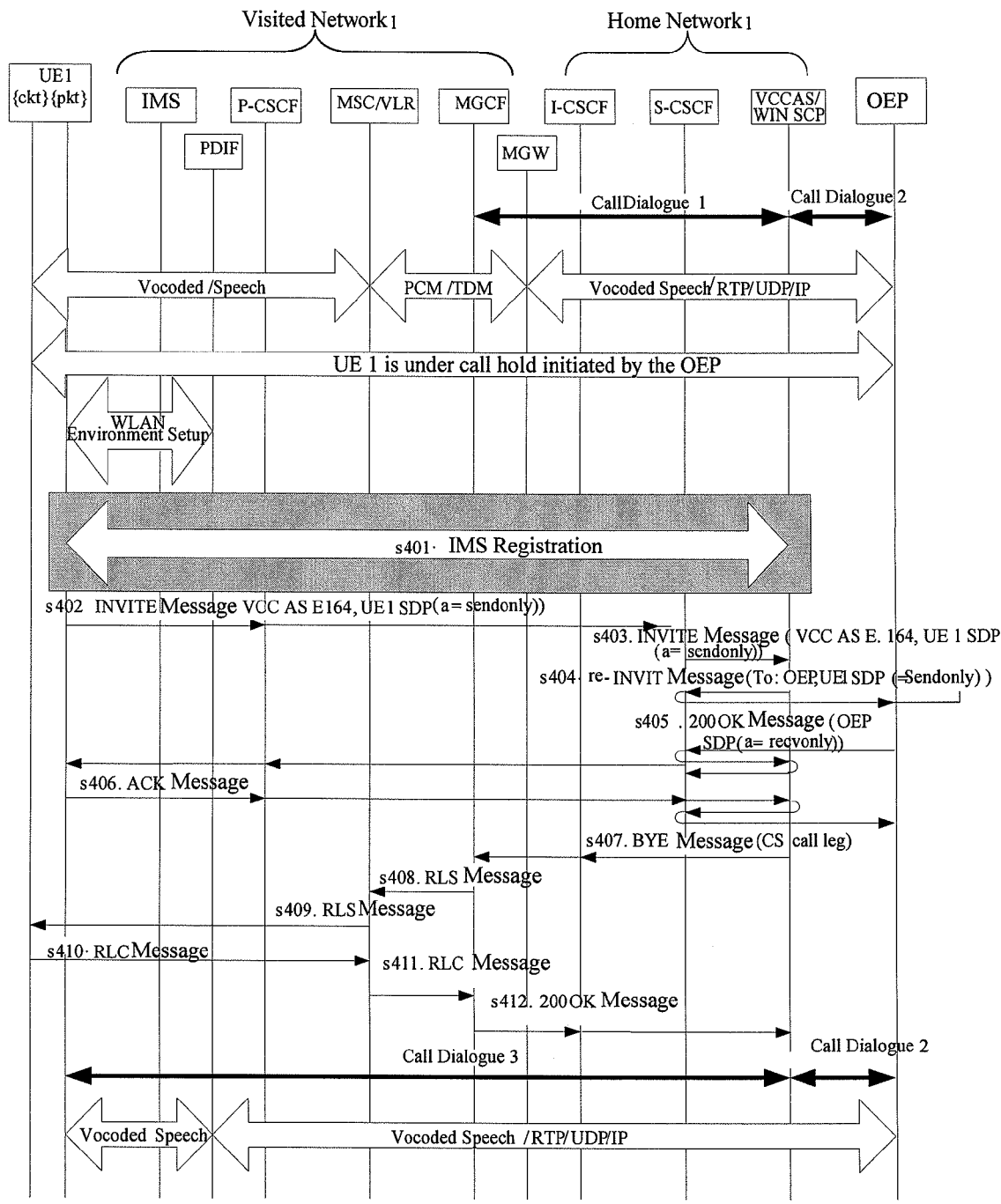
FIG. 7 is a flow chart of a method for a UE to perform handover from a CS network to an IMS network in call hold according to a first embodiment of the present disclosure.

FIG. 7 is a flow chart of a method for a UE to perform handover from a CS network to an IMS network in call hold according to a first embodiment of the present disclosure. In this embodiment, the method is achieved based on an SIP protocol. A call hold is actively initiated by a UE 1. The UE 1 sets up a call and carries out a conversation with an OEP via a CS network, and determines that the call needs to be handed over to an IMS network according to some policies (for example, changes in wireless conditions). A specific handover process mainly includes the following steps.

In Step s401, if the UE 1 is not already IMS registered, the UE 1 performs an IMS registration.

In Step s402, the UE 1 sends an INVITE message to a VCC AS via an S-CSCF (as a handover request), and starts to establish an SIP call dialog 3. The INVITE message includes a Request URI, i.e., an identity of the VCC AS (e.g., a Tel URI or an SIPURI), and also includes SDP information of the UE 1. In addition, it should be noted that, the SDP information of the UE 1 herein indicates that a media stream attribute of the UE 1 is sendonly.

In Step s403 to Step s404, the VCC AS detects that the call is in a call-hold state, generates a Re-INVITE message (in which, for example, the Request URI is modified into an address of the OEP, and Contact is modified into the identity of the VCC AS) according to the received INVITE message, and sends the Re-INVITE message to the OEP for performing a session negotiation (for example, media type, coding scheme, and media-transmission/reception IP address and port). The SDP information indicates that the media stream attribute of the UE 1 is sendonly.

In Step s405, the OEP returns a 200 OK message. The 200 OK message contains SDP information returned by the OEP. It should be noted that, the SDP information returned by the OEP herein indicates that a media stream attribute of the OEP is recvonly. The VCC AS sends the 200 OK message (corresponding to Step s401) to the UE 1.

In Step s406, functioning as an SIP three-way handshake mechanism, the UE 1 returns an ACK message, which finally arrives at the OEP.

In Step s407, the VCC AS sends a BYE message to an MGCF to release the call on the CS side.

In Step s408 to Step s411, the call on the CS side is released.

In Step s412, after receiving an RLC message, the MGCF generates a 200 OK message in response to the BYE message received in Step s407.

At this time, the UE 1 carries out a conversation with the OEP via the IMS network.

Figure 8:
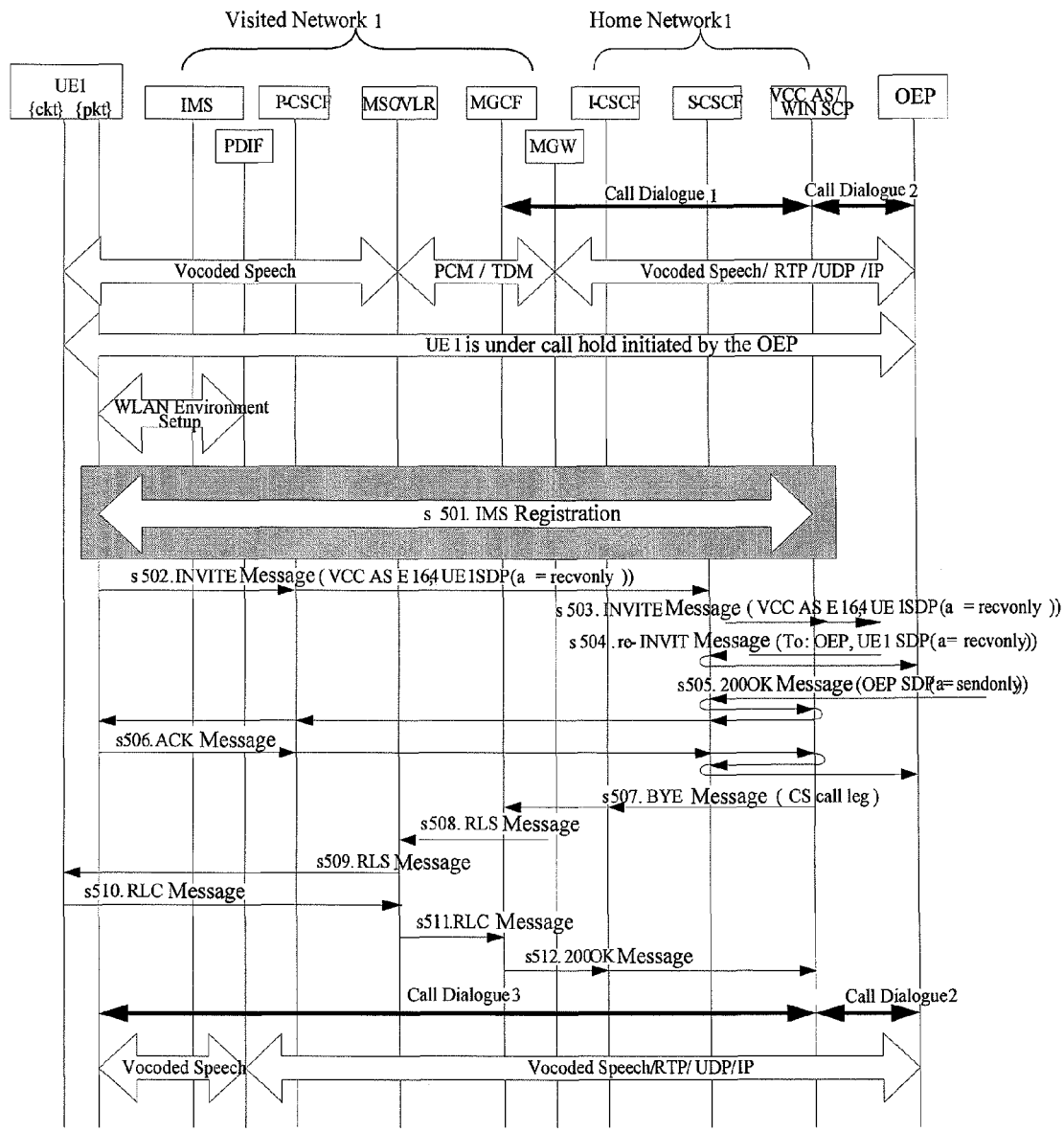
FIG. 8 is a flow chart of a method for a UE to perform handover from a CS network to an IMS network in call hold according to a second embodiment of the present disclosure.

FIG. 8 is a flow chart of a method for a UE to perform handover from a CS network to an IMS network in call hold according to a second embodiment of the present disclosure. In this embodiment, the method is achieved based on an SIP protocol. A call hold is actively initiated by an OEP, and a UE 1 knows the call-hold state. The UE 1 sets up a call and carries out a conversation with the OEP via a CS network, and determines that the call needs to be handed over to an IMS network according to some policies (for example, changes in wireless conditions). The method includes the following steps.

In Step s501, if the UE 1 is not already IMS registered, the UE 1 performs an IMS registration.

In Step s502, the UE 1 sends an INVITE message to a VCC AS via an S-CSCF (as a handover request), and starts to establish an SIP call dialog 3. The INVITE message includes a Request URI, that is, an E.164 number of VCC AS, and also includes SDP information of the UE 1. In addition, it should be noted that, the SDP information of the UE 1 herein indicates that a media stream attribute of the UE 1 is recvonly.

In Step s503 to Step s504, the VCC AS detects that the call is in a call-hold state, generates a Re-INVITE message (in which the Request URI is modified into an address of the OEP) according to the received INVITE message, and sends the Re-INVITE message to the OEP for performing a session negotiation (e.g., media type, coding scheme, and media-transmission/reception IP address and port). SDP information indicates that the media stream attribute of the UE 1 is recvonly.

In Step s505, the OEP returns a 200 OK message. The 200 OK message contains SDP information returned by the OEP. It should be noted that, the SDP information returned by the OEP herein indicates that a media stream attribute of the OEP is sendonly. The VCC AS sends the 200 OK message (corresponding to Step s501) to the UE 1.

In Step s506, functioning as an SIP three-way handshake mechanism, the UE 1 returns an ACK message, which finally arrives at the OEP.

In Step s507, the VCC AS sends a BYE message to an MGCF to release the call on the CS side.

In Step s508 to Step s511, the call on the CS side is released.

In Step s512, after receiving an RLC message, the MGCF generates a 200 OK message in response to the BYE message received in Step s507.

At this time, the UE 1 carries out a conversation with the OEP via the IMS network.

Figure 9:
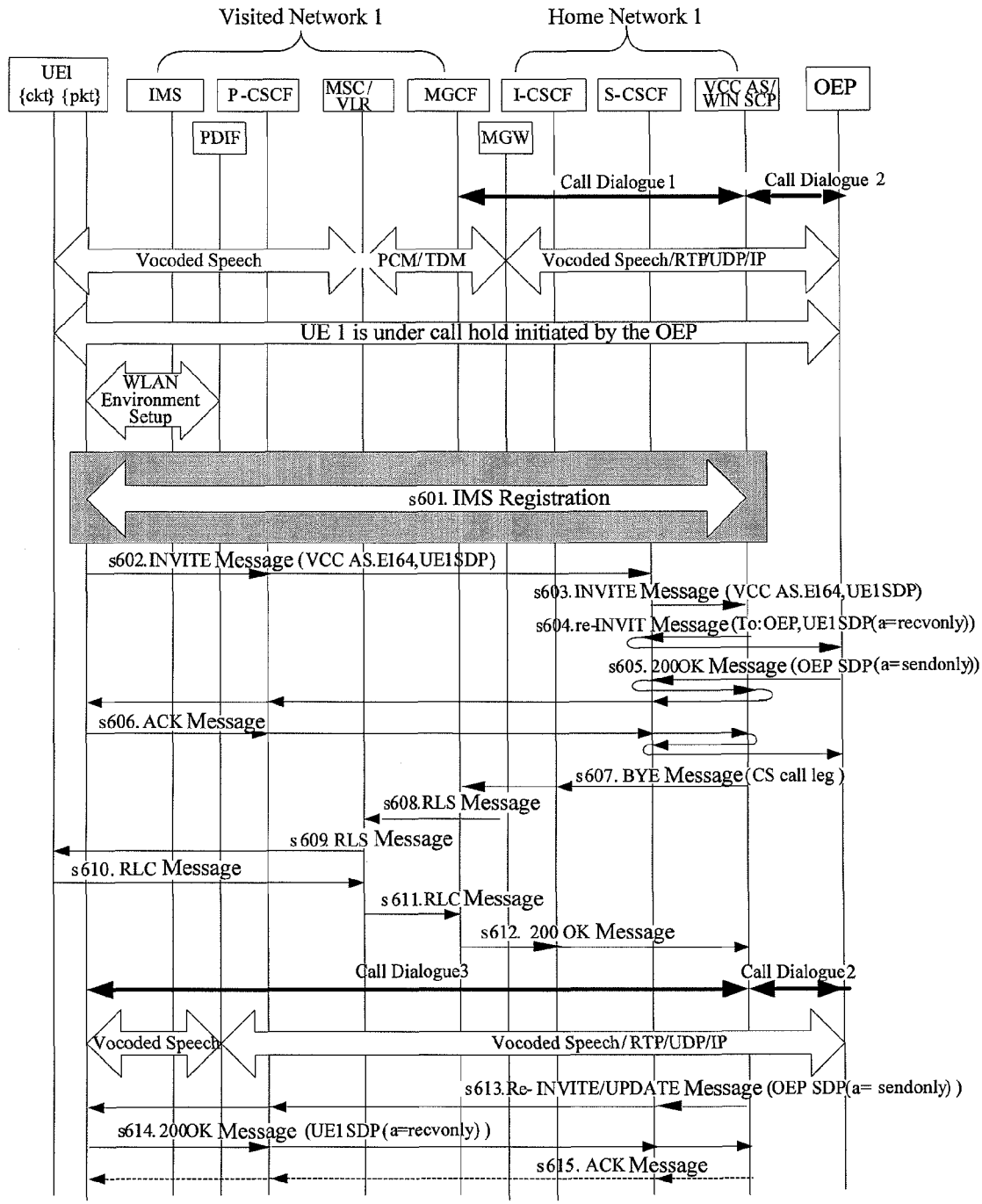
FIG. 9 is a flow chart of a method for a UE to perform handover from a CS network to an IMS network in call hold according to a third embodiment of the present disclosure.

FIG. 9 is a flow chart of a method for a UE to perform handover from a CS network to an IMS network in call hold according to a third embodiment of the present disclosure. In this embodiment, the method is achieved based on an SIP protocol. A call hold is actively initiated by an OEP, and a UE 1 does not know the call-hold state. The UE 1 sets up a call and carries out a conversation with the OEP via a CS network, and determines that the call needs to be handed over to an IMS network according to some policies (for example, changes in wireless conditions). The method includes the following steps.

In Step s601, if the UE 1 is not already IMS registered, the UE 1 performs an IMS registration.

In Step s602, the UE 1 sends an INVITE message to a VCC AS via an S-CSCF (as a handover request), and starts to establish an SIP call dialog 3. The INVITE message includes a Request URI that is an E.164 number of VCC AS, and also includes SDP information of the UE 1. The SDP information indicates that a media stream attribute of the UE 1 is both Send and Receive.

In Step s603 to Step s604, the VCC AS detects that the call is in a call-hold state, generates a Re-INVITE message (in which the Request URI is modified into an address of the OEP) according to the received INVITE message, and sends the Re-INVITE message to the OEP for performing a session negotiation (for example, media type, coding scheme, and media-transmission/reception IP address and port). The SDP information set by the UE 1 in the INVITE message added by the VCC AS indicates that the media stream attribute of the UE 1 is recvonly.

In Step s605, the OEP returns a 200 OK message that contains SDP information returned by the OEP. It should be noted that, the SDP information returned by the OEP is sendonly. The VCC AS sends the 200 OK message (corresponding to Step s501) to the UE 1.

In Step s606, functioning as an SIP three-way handshake mechanism, the UE 1 returns an ACK message, which finally arrives at the OEP.

In Step s607, the VCC AS sends a BYE message to an MGCF to release the call on the CS side.

In Step s608 to Step s611, the call on the CS side is released.

In Step s612, after receiving an RLC message, the MGCF generates a 200 OK message in response to the BYE message received in Step s607.

At this time, the UE 1 can carry out a conversation with the OEP via the IMS network.

Figure 10:
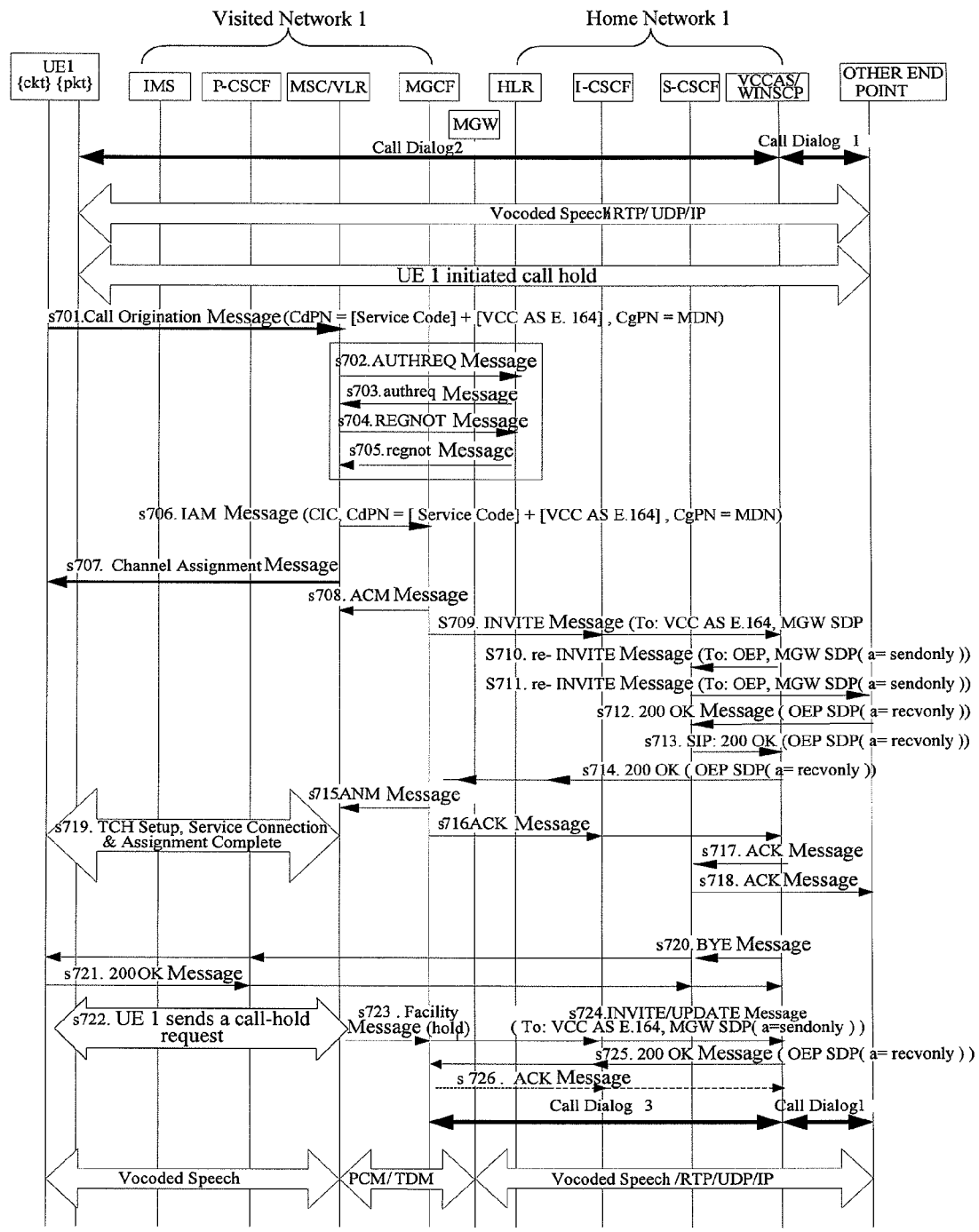
FIG. 10 is a flow chart of a method for a UE to perform handover from an IMS network to a CS network in call hold according to a first embodiment of the present disclosure.

FIG. 10 is a flow chart of a method for a UE to perform handover from an IMS network to a CS network in call hold according to a first embodiment of the present disclosure. In this embodiment, the method is achieved based on an SIP protocol. A call hold is actively initiated by a UE 1. The UE 1 sets up a call and carries out a conversation with an OEP via an IMS network, and determines that the call needs to be handed over to a CS network according to some policies (for example, changes in wireless conditions). A specific handover process mainly includes the following steps.

In Step s701, the UE 1 initiates a call via the CS network. A CdPN is a service code+an E.164 number of the VCC AS, and a CgPN is an MDN of the UEB (for example, 133xxxx5678).

In Step s702 to Step s705, if required, an authentication and registration process of the CS network is performed.

In Step s706, an MSC generates an ISUP IAM and sends the ISUP IAM to an MGCF. The E.164 number of the VCC AS is used as the CdPN, the MDN of UE 1 is used as the CgPN, and the MSC discards the value of the service code.

In Step s707, the MSC/VLR sends a traffic channel assignment message to the UE 1, that is, the CS network assigns a traffic channel to the UE 1.

In Step s708, the MGCF sends an ACM to the MSC/VLR.

In Step s709, the MGCF generates an INVITE message (including TRK information allocated to the call, i.e., MGW SDP, containing IP address and bandwidth, and SDP information indicating that a media stream attribute of an MGW is both send and receive). A Request URI in the INVITE message is the E.164 number of the VCC AS. The message is sent to the VCC AS via an I-CSCF.

In Step s710 to Step s711, the VCC AS generates a Re-INVITE message (in which the Request URI is modified into an address of the OEP) according to the received INVITE message, and sends the Re-INVITE message to the OEP via an S-CSCF. It should be noted that, the SDP information herein indicates that the media stream attribute of the MGW is sendonly.

In Step s712 to Step s713, the OEP returns a 200 OK message that contains SDP information returned by the OEP to the VCC AS via the S-CSCF. It should be noted that, the SDP information returned by the OEP indicates that a media stream attribute of the OEP is recvonly.

In Step s714, the VCC AS sends the 200 OK message to the MGCF via the I-CSCF. It should be noted that, herein, the SDP information of the OEP carried in the 200 OK message indicates that the media stream attribute of the OEP is both Send and Receive.

In Step s715, correspondingly, the MGCF generates an ANM and sends the ANM to the MSC.

In Step s716, functioning as an SIP three-way handshake mechanism, the MGCF generates an ACK message and sends the ACK message to the VCC AS.

In Step s717 to Step s718, the VCC AS sends the ACK message to the OEP via the S-CSCF.

In Step s719, in any step after Step s709, the UE 1 and the CS network completes a traffic channel acquisition.

In Step s720 to Step s721, after sending the ACK message to the OEP, the VCC AS immediately sends a BYE message to the UE 1 to release a call leg on the IMS side, and the UE 1 returns a 200 OK response message.

In addition, as the MSC does not know the call-hold state of the UE 1, the UE 1 also needs to synchronize a call-hold state of the MSC, that is, in Step s722, the UE 1 sends a call-hold request (for example, a flash with information/hold request message) to the MSC.

After receiving the call-hold request, the MSC sends a call-hold request (e.g., a call progress (CPG)) message to the MGCF. The CPG message contains a call hold indication of the OEP. The MGCF converts the CPG message into a Re-INVITE/UPDATE message and sends the Re-INVITE/UPDATE message to the VCC AS (Step s723 to Step s726). The SDP content includes an attribute line "a=sendonly". It should be noted that, if the MGCF adopts an UPDATE message, the MGCF does not need to send an ACK message to the VCC AS.

Figure 11:
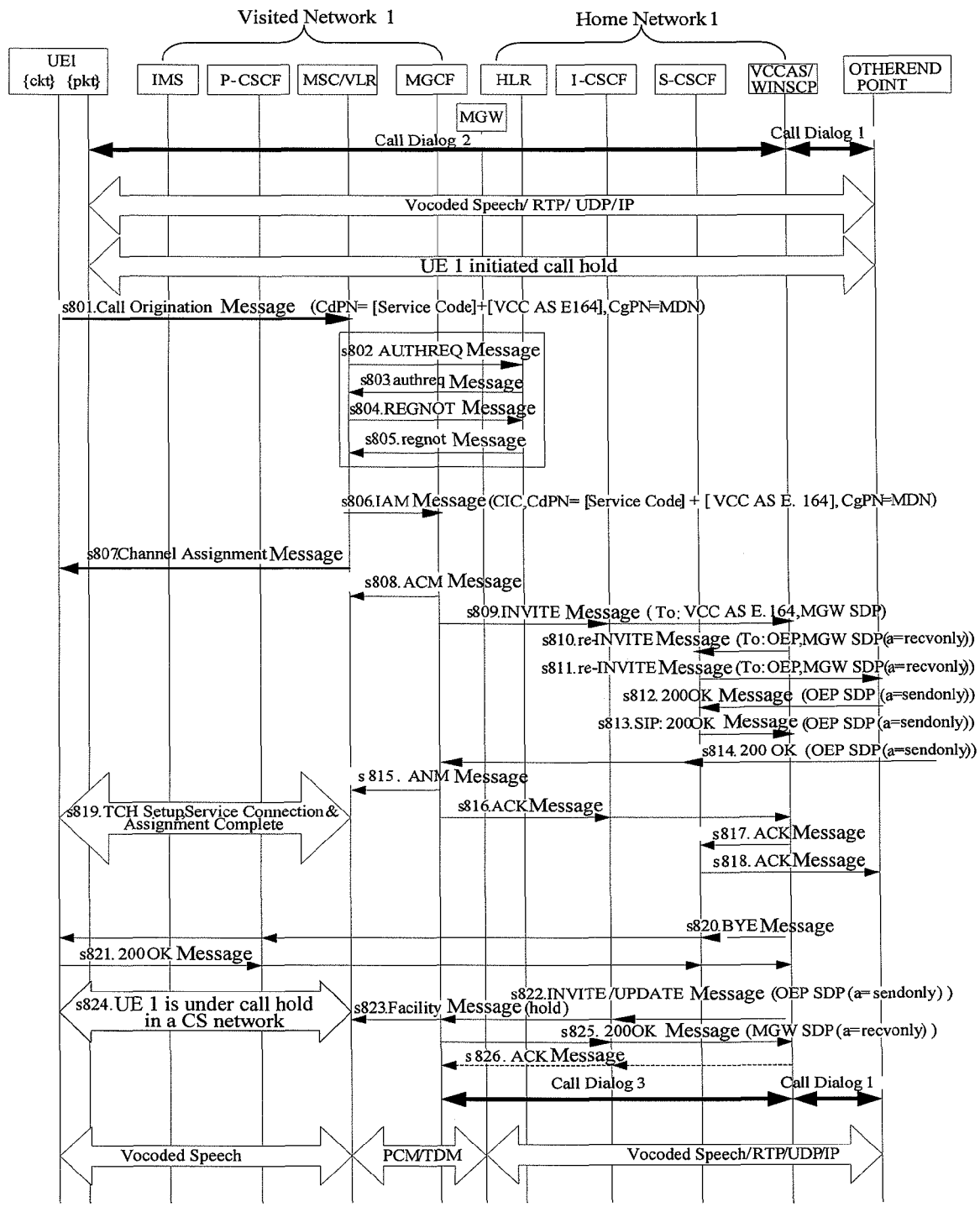
FIG. 11 is a flow chart of a method for a UE to perform handover from an IMS network to a CS network in call hold according to a second embodiment of the present disclosure.

FIG. 11 is a flow chart of a method for a UE to perform handover from an IMS network to a CS network in call hold according to a second embodiment of the present disclosure. In this embodiment, the method is achieved based on an SIP protocol. A call hold is actively initiated by an OEP. A UE 1 sets up a call and carries out a conversation with the OEP via an IMS network, and determines that the call needs to be handed over to a CS network according to some policies (for example, changes in wireless conditions). A specific handover process mainly includes the following steps.

In Step s801, the UE 1 initiates a call via the CS network. A CdPN is a service code+an E.164 number of the VCC AS, and a CgPN is an MDN of the UE 1 (e.g., 133xxxx5678).

In Step s802 to Step s805, if required, an authentication and registration process of the CS network is performed.

In Step s806, an MSC generates an ISUP IAM and sends the ISUP IAM to an MGCF. The E.164 number of the VCC AS is used as the CdPN, the MDN of UE 1 is used as the CgPN, and the MSC discards the value of the service code.

In Step 807, the MSC/VLR sends a traffic channel assignment message to the UE 1, that is, the CS network assigns a traffic channel to the UE 1.

In Step s808, the MGCF sends an ACM to the MSC.

In Step s809, the MGCF generates an INVITE message (including TRK information allocated to the call, i.e., MGW SDP, containing IP address and bandwidth, and SDP information indicating that a media stream attribute of an MGW is both send and receive). A Request URI in the INVITE message is the E.164 number of the VCC AS. The message is sent to the VCC AS via an I-CSCF.

In Step s810 to Step s811, the VCC AS generates a Re-INVITE message (in which the Request URI is modified into an address of the OEP) according to the received INVITE message, and sends the Re-INVITE message to the OEP via an S-CSCF. It should be noted that, SDP information of the MGCF herein indicates that the media stream attribute of the MGW is recvonly.

In Step s812 to Step s813, the OEP returns a 200 OK message that contains SDP information returned by the OEP to the VCC AS via the S-CSCF. It should be noted that, the SDP information returned by the OEP indicates that a media stream attribute of the OEP is sendonly.

In Step s814, the VCC AS sends the 200 OK message to the MGCF via the I-CSCF. It should be noted that, herein, the SDP information of the OEP carried in the 200 OK message indicates that the media stream attribute of the OEP is both Send and Receive.

In Step s815, correspondingly, the MGCF generates an ANM and sends the ANM to the MSC.

In Step s816, functioning as an SIP three-way handshake mechanism, the MGCF generates an ACK message and sends the ACK message to the VCC AS.

In Step s817 to Step s818, the VCC AS sends the ACK message to the OEP via the S-CSCF.

In Step s819, in any step after Step s809, the UE 1 and the CS network completes a traffic channel acquisition.

In Step s820 to Step s821, after sending the ACK message to the OEP, the VCC AS may immediately send a BYE message to the UE 1 to release a call leg on the IMS side, and the UE 1 returns a 200 OK response message.

In addition, as the MSC does not know the call-hold state, in this embodiment, the VCC AS also needs to synchronize a call-hold state of the CS network where the UE 1 is located, that is, the VCC AS sends a Re-INVITE/UPDATE message to the MGCF to hold the call (Step s822 to Step s826, in which the SDP content includes an attribute line "a=sendonly") after the handover. The MGCF converts the Re-INVITE/UPDATE message into a CPG message containing a remote hold indication, and then sends the CPG message to the MSC/VLR. The MSC/VLR may send a call-on-hold message (e.g., a Facility (Invoke=NotifySS (HOLD, CallOnHold-Indicator) in a GSM/UMTS network) to the UE 1.

If the VCC AS uses an UPDATE message, the VCC AS does not need to send an ACK message to the MGCF.

Figure 12:
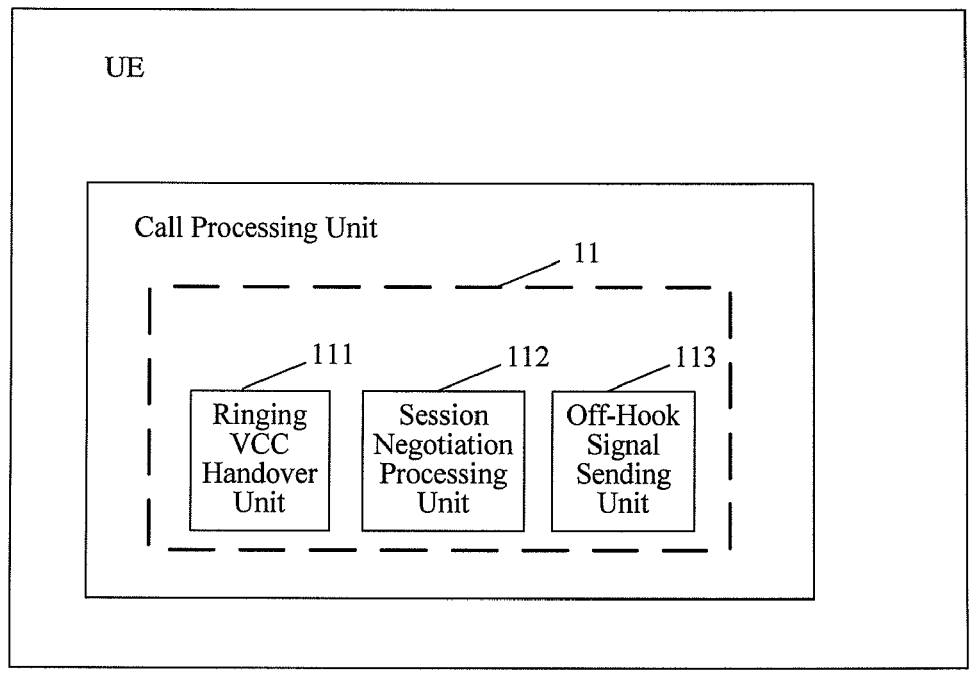
FIG. 12 is a schematic structural view of a UE for performing a ringing VCC network handover according to an embodiment of the present disclosure.

FIG. 12 is a schematic structural view of a UE for performing a ringing VCC network handover according to an embodiment of the present disclosure. Referring to FIG. 12, the UE includes a call processing unit. In the present disclosure, the call processing unit is improved. That is, in the present disclosure, the call processing unit is configured with a ringing VCC handover unit 11 adapted to perform a ringing VCC network handover.

Divided according to logical functions to be achieved, the ringing VCC handover unit 11 in this embodiment includes three logical functional units, namely, a ringing VCC handover unit 111, a session negotiation processing unit 112, and an off-hook signal sending unit 113.

The session negotiation processing unit 112 is adapted to perform a ringing session negotiation on call continuity handover with a calling UE at an OEP via a target network, i.e., mainly adapted to perform a ringing VCC handover session negotiation. In the present disclosure, the session negotiation processing unit 112 is mainly adapted to initiate a call to a VCC AS for performing a session negotiation with the OEP. For a specific process, reference can be made to the description of the foregoing operation flow.

The ringing VCC handover unit 111 is adapted to perform a ringing call continuity network handover after the session negotiation succeeds.

The off-hook signal sending unit 113 is adapted to send an off-hook signal to the calling UE at the OEP according to a handover result of the ringing VCC handover unit 111, i.e., send an off-hook signal to the VCC AS after the network handover succeeds.

Figure 13:
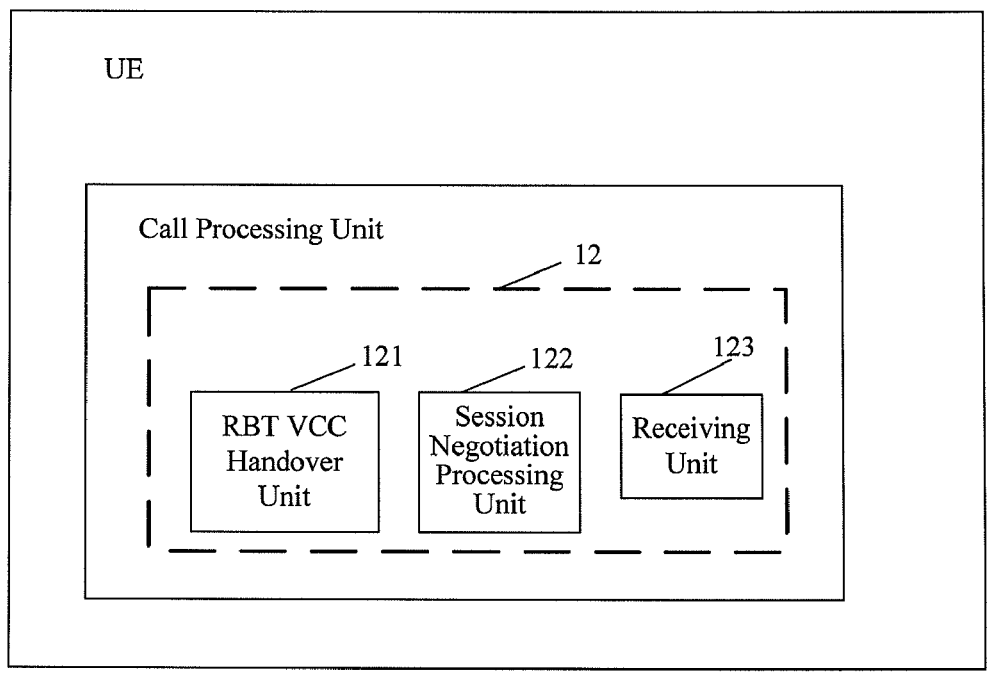
FIG. 13 is a schematic structural view of a UE for performing an RBT VCC network handover according to an embodiment of the present disclosure.

FIG. 13 is a schematic structural view of a UE for performing an RBT VCC network handover according to an embodiment of the present disclosure. Referring to FIG. 13, the UE includes a call processing unit. In the present disclosure, the call processing unit is improved. That is, in the present disclosure, the call processing unit is configured with an RBT VCC handover processing unit 12 adapted to perform an RBT VCC network handover.

As divided according to logical functions to be achieved, the RBT VCC handover processing unit in the present disclosure includes three logical functional units, namely, an RBT VCC handover unit 121, a session negotiation processing unit 122, and a receiving unit 123.

The RBT VCC handover unit 121 is adapted to perform an RBT call continuity network handover after the session negotiation succeeds.

The session negotiation processing unit 122 is adapted to perform an RBT session negotiation on call continuity handover with a called UE at an OEP via a target network, i.e., mainly adapted to perform an RBT VCC handover session negotiation. In the present disclosure, the session negotiation processing unit 122 is mainly adapted to initiate a call to a VCC AS for performing a session negotiation with the OEP. For a specific process, reference can be made to the description of the foregoing operation flow.

The receiving unit 123 is adapted to receive an off-hook signal sent by the called UE at the OEP after the network handover is completed.

Moreover, as divided according to logical functions to be achieved, the RBT VCC handover processing unit in the present disclosure includes two logical functional units, namely, an RBT VCC handover initiation unit and a session negotiation processing unit. The RBT VCC handover initiation unit is mainly adapted to initiate an RBT VCC handover according to a predefined policy. The session negotiation processing unit is mainly adapted to perform a VCC handover session negotiation, and in the present disclosure, mainly adapted to initiate a call to a VCC AS for performing a session negotiation with an OEP. For a specific process, reference can be made to the description of the foregoing operation flow.

Figure 14:
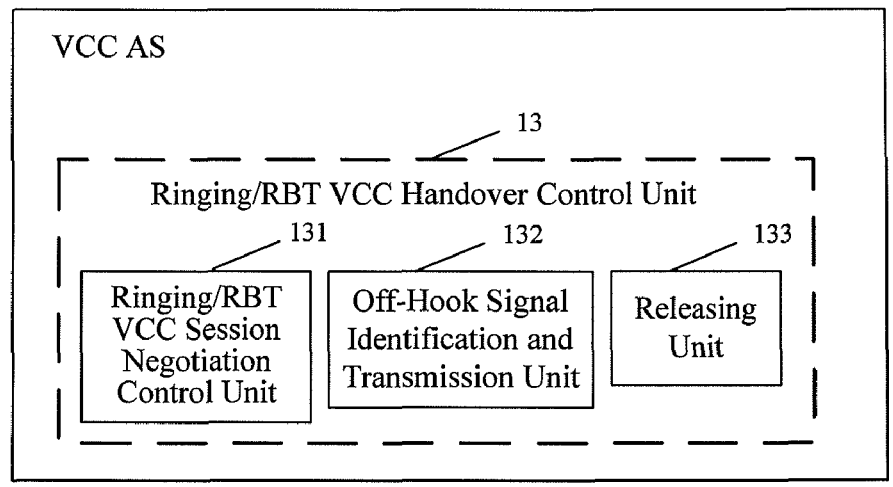
FIG. 14 is a schematic structural view of a VCC AS for performing a ringing/RBT VCC network handover control according to an embodiment of the present disclosure.

FIG. 14 is a schematic structural view of a VCC AS for performing a ringing/RBT VCC network handover control according to an embodiment of the present disclosure. In the present disclosure, the VCC AS is improved. That is, in the present disclosure, the VCC AS is configured with a ringing/RBT VCC handover control unit 13 adapted to control a VCC network handover in ringing/RBT.

Divided according to logical functions to be achieved, in the present disclosure, the ringing/RBT VCC handover control unit mainly includes two functional units, namely, a ringing/RBT VCC session negotiation control unit 131 and an off-hook signal identification and transmission unit 132.

The ringing/RBT VCC session negotiation control unit 131 is adapted to control a session negotiation on call continuity network handover in ringing/RBT. For a specific process, reference can be made to the description of the foregoing operation flow, and the details thereof are not given herein again.

The off-hook signal identification and transmission unit 132 is mainly adapted to identify an off-hook signal of a called UE and transmit the off-hook signal to a calling UE, thereby completing the handover.

Preferably, the VCC AS may further include: a releasing unit 133, mainly adapted to release a call leg in a network to be handed over after the session negotiation succeeds.

Figure 15:
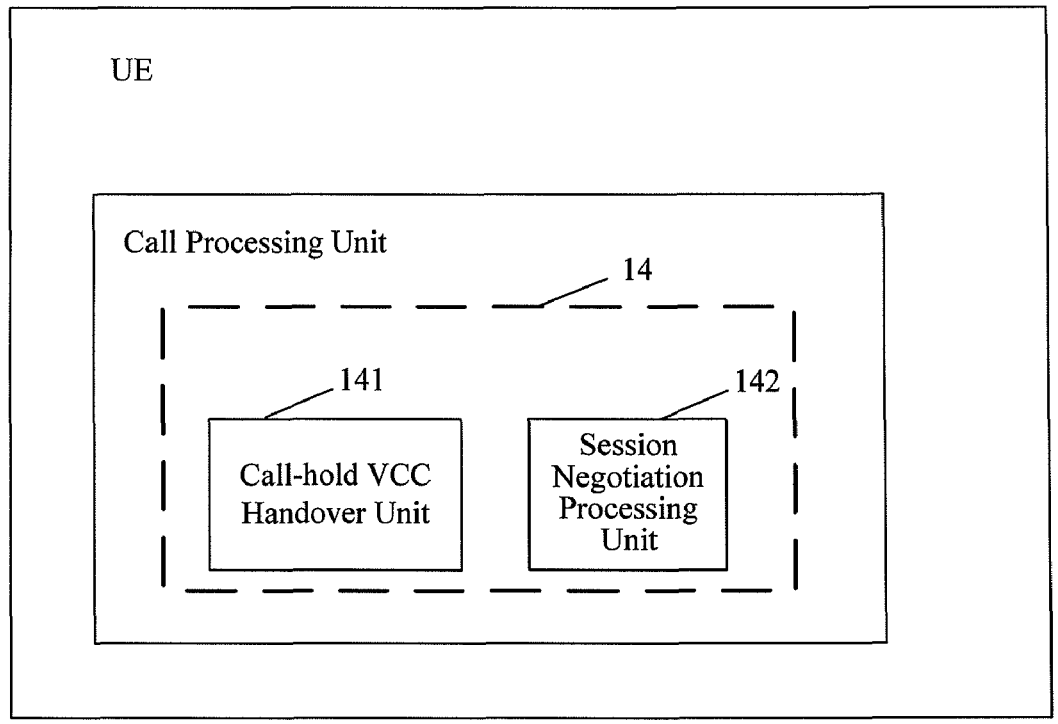
FIG. 15 is a schematic structural view of a UE for performing a call-hold VCC network handover according to an embodiment of the present disclosure.

FIG. 15 is a schematic structural view of a UE for performing a call-hold VCC network handover according to an embodiment of the present disclosure. Referring to FIG. 15, the UE includes a call processing unit. In the present disclosure, the call processing unit is improved. That is, in the present disclosure, the call processing unit is configured with a call-hold VCC handover processing unit 14 mainly adapted to perform a VCC network handover in call hold.

As divided according to logical functions to be achieved, the call-hold VCC handover processing unit in the present disclosure includes two logical functional units, namely, a session negotiation processing unit 142 and a call-hold VCC handover unit 141.

The session negotiation processing unit 142 is adapted to perform a session negotiation on call continuity handover in a call-hold state with an OEP via a target network, i.e., to perform a session negotiation for a VCC handover to the target network in call hold.

The call-hold VCC handover unit 141 is adapted to hand over the UE to the target network after the session negotiation succeeds.

Moreover, as divided according to logical functions to be achieved, the call-hold VCC handover processing unit in the present disclosure includes two logical functional units, namely, a call-hold VCC handover initiation unit and a session negotiation processing unit. The call-hold VCC handover initiation unit is mainly adapted to identify and initiate a call-hold VCC handover according to a predefined policy. The session negotiation processing unit is mainly adapted to perform a session negotiation for a handover to a target network in call hold.

Figure 16:
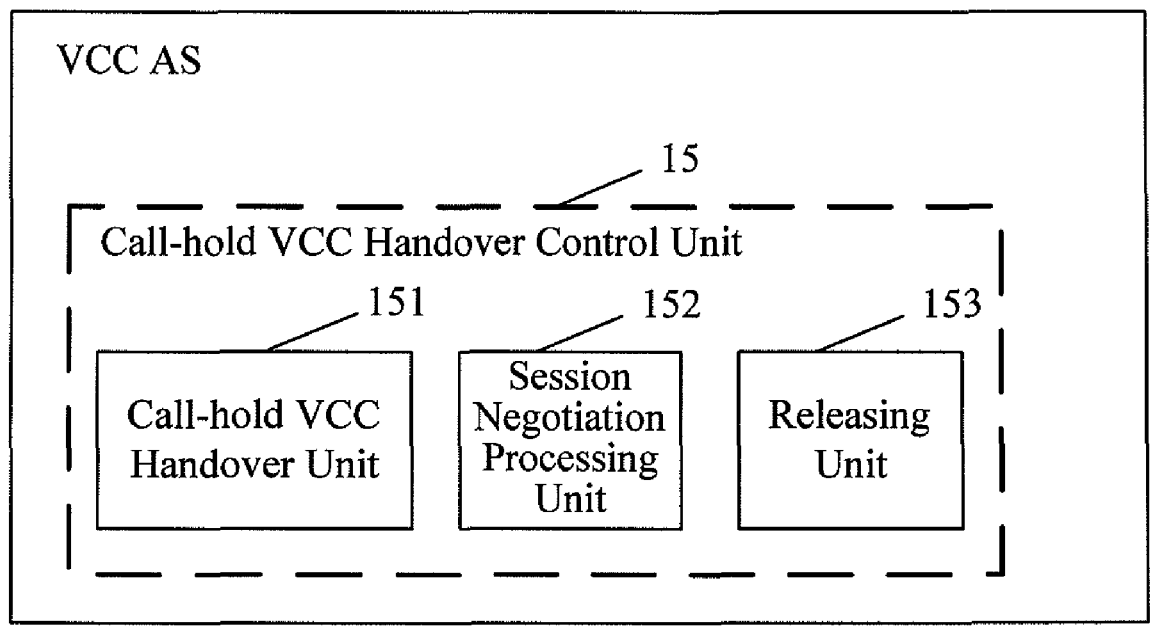
FIG. 16 is a schematic structural view of a VCC AS for performing a call-hold VCC network handover control according to an embodiment of the present disclosure.

FIG. 16 is a schematic structural view of a VCC AS for performing a call-hold VCC network handover control according to an embodiment of the present disclosure. In the present disclosure, the VCC AS is improved. That is, in the present disclosure, the VCC AS is configured with a call-hold VCC handover control unit 15 mainly adapted to control a VCC network handover in call hold.

As divided according to logical functions to be achieved, the call-hold VCC handover control unit 15 in the present disclosure mainly includes two functional units, namely, a session negotiation processing unit 152 and a call-hold VCC handover unit 151.

The session negotiation processing unit 152 is mainly adapted to perform a session negotiation for a handover to a target network in a call-hold state, i.e., to perform a session negotiation for a VCC handover to the target network in call hold.

The call-hold VCC handover unit 151 is adapted to control a call continuity network handover in call hold after the session negotiation succeeds.

Preferably, in this embodiment, the VCC AS may further include: a releasing unit 154, mainly adapted to release a call leg in a network to be handed over after the session negotiation succeeds.

Moreover, as divided according to logical functions to be achieved, the call-hold VCC handover control unit 15 in the present disclosure mainly includes two functional units, namely, a call-hold VCC handover initiation unit 151 and a session negotiation processing unit 152. The call-hold VCC handover initiation unit 151 is mainly adapted to identify and initiate a call-hold VCC handover according to a predefined policy. The session negotiation processing unit 152 is mainly adapted to perform a session negotiation for a handover to a target network in call hold.

Similar to the foregoing, in this embodiment, the VCC AS may further include: a releasing unit 153, mainly adapted to release a call leg in a network to be handed over after the session negotiation succeeds.

It will be apparent to those skilled in the art that various modifications and variations can be made to the present disclosure without departing from the scope or spirit of the disclosure. In view of the foregoing, it is intended that the present disclosure cover modifications and variations of this disclosure provided that they fall within the scope of the following claims and their equivalents.

What is claimed is:

1. A method for a user equipment (UE) to perform network handover, comprising:
   sending, by the UE, a network handover request carrying session description information of the UE to a call continuity application server in a target network;
   performing, by the UE that initiates a handover, a session negotiation on call continuity handover in a call-hold state with an Other End Point (OEP) according to the session description information via the call continuity application server; and
   handing over a call corresponding to the network handover request to the target network after the session negotiation succeeds; and
   wherein the session description information includes call-hold information of the UE that initiates the network handover.

2. The method according to claim 1, wherein a network to be handed over by the UE that initiates the handover is a circuit switched (CS) network, wherein the target network is an IP multimedia subsystem (IMS) network, and wherein the performing, by the UE that initiates the handover, the call-hold session negotiation with the OEP via the call continuity application server in the target network further comprises:
   sending, by the UE that initiates the handover, the network handover request carrying session description information of the UE to the call continuity application server via the IMS network.

3. The method according to claim 1, wherein a network to be handed over is an IMS network, and the target network is a circuit switched (CS) network, and
   the performing, by the UE that initiates the handover, the call-hold session negotiation with the OEP via the call continuity application server in the target network further comprises: sending, by the UE that initiates the handover, an INVITE message to the call continuity application server via the CS network, a mobile switching center (MSC), and a media gateway control function (MGCF), wherein the INVITE message contains session description information of the MGCF.

4. A network handover method of a user equipment (UE), comprising:
   receiving a network handover request from the UE that initiates a handover, wherein the network handover request carries session description information of the UE;
   if it is detected that a call is in a call-hold state, updating the session description information and sending the session description information carrying call-hold information of the UE that initiates the handover to an Other End Point (OEP); and
   handing over the call to a target network according to the network handover request after a session negotiation of the UE with the OEP, by using the session description information, succeeds.

5. The method according to claim 4, further comprising: receiving session description information carrying call-hold information of the OEP fed back from the OEP, and sending the session description information carrying the call-hold information of the OEP to the UE that initiates the handover.

6. The method according to claim 4, wherein the detected call-hold state is a call hold initiated by the UE that initiates the handover, and
   the session description information of the UE is send-only (sendonly) session description information, and the session description information to the OEP is receive-only (recvonly) session description information.

7. The method according to claim 4, wherein the call-hold state detected by a call continuity application server is a call hold initiated by the OEP; and
   the session description information of the UE is receive-only (recvonly) session description information, and the session description information to the OEP is send-only (sendonly) session description information.

8. The method according to claim 6, wherein the recvonly session description information is added by the UE that initiates the handover or the call continuity application server.

9. The method according to any one of claims 4 to 7, further comprising: releasing a call leg of a network to be handed over.

10. The method according to any one of claim 4, wherein the network to be handed over is an IP multimedia subsystem (IMS) network, and the target network is a circuit switched (CS) network;
    an INVITE message sent by the UE that initiates the handover via the CS network and a mobile switching center (MSC) is received from a media gateway control function (MGCF), and the INVITE message contains session description information of the MGCF; and
    the updating the session description information and sending the session description information carrying the call-hold information of the UE that initiates the handover to the OEP further comprises:
    generating an UPDATE message of the session description information according to the INVITE message, and sending the INVITE or the UPDATE message that contains session description information carrying call-hold information of the MGCF to the OEP.

11. The method according to claim 10, wherein the detected call-hold state is a call hold initiated by the UE that initiates the handover; wherein the session description information carrying the call-hold information of the MGCF is send-only (sendonly) session description information; and wherein the session description information carrying the call-hold information of the OEP is receive-only (recvonly) session description information, further comprises: synchronizing call-hold states of the UE that initiates the handover and the MSC after the session negotiation succeeds.

12. The method according to claim 10, wherein the detected call-hold state is a call hold initiated by the OEP; wherein the session description information carrying the call-hold information of the MGCF is receive-only (recvonly) session description information; and wherein the session description information carrying the call-hold information of the OEP is send-only (sendonly) session description information, further comprises: synchronizing call-hold states of the call continuity application server and the CS network after the session negotiation succeeds.

13. A user equipment (UE), comprising:
    a session negotiation processing unit configured to send a network handover request carrying session description information of the UE to a call continuity application server in a target network, and perform a session negotiation on call continuity handover in a call-hold state with an Other End Point (OEP) according to the session description information via the call continuity application server; and a call-hold call continuity handover unit configured to hand over a call corresponding to the network handover request to the target network after the session negotiation succeeds; and wherein the session description information includes call-hold information of the UE that initiates the network handover.

14. A call continuity application server, comprising:

a processing unit configured to receive a network handover request from the UE that initiates a handover wherein the network handover request carries session description information of the UE, if it is detected that a call is in a call-hold state update the session description information and send the session description information carrying call-hold information of the UE that initiates the handover to an Other End Point (OEP), and perform a session negotiation by using the session description information for a handover to a target network in a call-hold state; and a control unit configured to control a call continuity network handover in a call-hold state after the session negotiation succeeds.

15. The call continuity application server according to claim 14, further comprising:

a releasing unit configured to release a call leg in a network to be handed over after the session negotiation succeeds.

* * * * *

UNITED STATES PATENT AND TRADEMARK OFFICE
CERTIFICATE OF CORRECTION

PATENT NO. : 8,155,084 B2
APPLICATION NO. : 12/368620
DATED : April 10, 2012
INVENTOR(S) : Shuiping Long et al.

It is certified that error appears in the above-identified patent and that said Letters Patent is hereby corrected as shown below:

In the Claims

In column 22, claim 13, line 67, after "server;" delete "and".

Signed and Sealed this
Nineteenth Day of March, 2013

Teresa Stanek Rea
*Acting Director of the United States Patent and Trademark Office*